(12) United States Patent
Knoll et al.

(10) Patent No.: US 8,337,988 B2
(45) Date of Patent: Dec. 25, 2012

(54) COATED ARTICLE HAVING LOW-E COATING WITH ABSORBER LAYER(S)

(75) Inventors: Hartmut Knoll, Bitterfeld (DE); Jochen Butz, Wolfen (DE); Uwe Kriltz, Jena (DE); Bernd Disteldorf, Mettlach (DE); Jose Ferreira, Rumelange (LU); Pierrot Pallotta, Villerupt (FR)

(73) Assignees: Centre Luxembourgeois de Recherches pour le Verre et la Ceramique S.A. (C.R.V.C.), Luxembourg (LU); Guardian Industries Corp., Auburn Hills, MI (US)

( * ) Notice: Subject to any disclaimer, the term of this patent is extended or adjusted under 35 U.S.C. 154(b) by 27 days.

(21) Appl. No.: 12/662,561

(22) Filed: Apr. 22, 2010

(65) Prior Publication Data
US 2011/0261442 A1 Oct. 27, 2011

(51) Int. Cl.
*B32B 15/04* (2006.01)

(52) U.S. Cl. ........ 428/432; 428/426; 428/428; 428/699; 428/698; 428/701; 428/702

(58) Field of Classification Search .......... 428/426, 428/432, 433, 446, 697, 698, 701, 702, 704, 428/699, 428
See application file for complete search history.

(56) References Cited

U.S. PATENT DOCUMENTS

| | | | |
|---|---|---|---|
| 5,514,476 A | 5/1996 | Hartig et al. | |
| 6,692,831 B2 * | 2/2004 | Stachowiak | 428/428 |
| 6,797,388 B1 | 9/2004 | Szanyi et al. | |
| 6,863,928 B2 | 3/2005 | Stachowiak | |
| 6,890,659 B2 | 5/2005 | Stachowiak | |
| 6,967,060 B2 | 11/2005 | Stachowiak | |
| 7,081,301 B2 | 7/2006 | Stachowiak | |
| 7,150,916 B2 | 12/2006 | Lemmer et al. | |
| 7,166,360 B2 | 1/2007 | Coustet et al. | |
| 7,294,402 B2 | 11/2007 | Laird | |
| 7,314,668 B2 | 1/2008 | Lingle et al. | |
| 7,449,218 B2 | 11/2008 | Veerasamy | |

(Continued)

FOREIGN PATENT DOCUMENTS

WO WO 2009/157970 12/2009

(Continued)

OTHER PUBLICATIONS

U.S. Appl. No. 11/898,557, filed Sep. 13, 2007, Laird et al.

(Continued)

*Primary Examiner* — Jennifer McNeil
*Assistant Examiner* — Lauren Robinson
(74) *Attorney, Agent, or Firm* — Nixon & Vanderhye P.C.

(57) ABSTRACT

A coated article is provided, having a coating supported by a glass substrate where the coating includes at least one color and/or reflectivity-adjusting absorber layer. The absorber layer(s) allows color tuning, and reduces the glass side reflection of the coated article and/or allows sheet resistance of the coating to be reduced without degrading glass side reflection. In certain example embodiments the absorber layer is provided between first and second dielectric layers which may be of substantially the same material and/or composition. In certain example embodiments, the coated article is capable of achieving desirable transmission, together with desired color, low reflectivity, and low selectivity, when having only one infrared (IR) reflecting layer of silver and/or gold. Coated articles according to certain example embodiments of this invention may be used in the context of insulating glass (IG) window units, monolithic windows, or the like.

24 Claims, 7 Drawing Sheets

U.S. PATENT DOCUMENTS

| | | | |
|---|---|---|---|
| 7,507,442 B2 | 3/2009 | Veerasamy | |
| 7,597,965 B2 | 10/2009 | Blacker et al. | |
| 7,648,769 B2 | 1/2010 | Blacker et al. | |
| 7,695,785 B2 | 4/2010 | Lu et al. | |
| 2004/0224167 A1* | 11/2004 | Stachowiak | 428/432 |
| 2005/0123772 A1 | 6/2005 | Coustet et al. | |
| 2005/0196622 A1* | 9/2005 | Laird et al. | 428/432 |
| 2008/0008876 A1 | 1/2008 | Laird et al. | |
| 2008/0070044 A1 | 3/2008 | Blacker et al. | |
| 2009/0324934 A1 | 12/2009 | Blacker et al. | |

FOREIGN PATENT DOCUMENTS

| | | |
|---|---|---|
| WO | WO 2010/072973 | 7/2010 |
| WO | WO 2010/072974 | 7/2010 |
| WO | WO 2010/142926 | 12/2010 |

OTHER PUBLICATIONS

International Search Report mailed Jul. 22, 2011.

\* cited by examiner

COATED ARTICLE HAVING LOW-E COATING WITH ABSORBER LAYER(S)

Certain example embodiments of this invention relate to a coated article including a glass substrate supporting a low-E coating, where the low-E coating includes at least one absorber layer for controlling color and/or reflectivity of the coated article. The coated article may be used in an insulating glass (IG) window unit in certain example embodiments.

BACKGROUND OF THE INVENTION

Coated articles are known in the art for use in window applications such as insulating glass (IG) window units, vehicle windows, and/or the like. It is known that in certain instances, it may be desirable to heat treat (e.g., thermally temper, heat bend and/or heat strengthen) such coated articles for purposes of tempering, bending, or the like.

Insulating glass (IG) windows are known in the art. Conventional IG window units include at least first and second glass substrates (one of which may have a solar control coating on an interior surface thereof) that are coupled to one another via at least one seal(s) or spacer(s). The resulting space or gap between the glass substrates may or may not be filled with gas and/or evacuated to a low pressure in different instances. Some IG window units are tempered. Thermal tempering of the glass substrates for such IG units typically requires heating the glass substrates to temperature(s) of at least about 580 degrees C. for a sufficient period of time to enable thermal tempering. Monolithic architectural windows for use in homes or building are also known in the art, and can include a coating supported by a glass substrate. Fixture windows in homes may be made of glass sheets. Such monolithic windows can also optionally be thermally tempered for safety purposes. Heat treatment (e.g., thermal tempering) of coated articles typically requires use of temperature(s) of at least 580 degrees C., more preferably of at least about 600 degrees C. and still more preferably of at least 620 degrees C.

In certain situations, designers of coated articles often strive for a combination of desirable visible transmission, desirable color, low reflectance, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors. Designers of coated articles also seek to have particular color appearances (e.g., when viewed from outside of a building or vehicle on/in which the coated article is mounted) and/or low visible reflectance. Typically, thick IR reflecting layers (e.g., silver based layers), while blocking IR, cause visible reflectance to increase. Thus, it the past it has been difficult to achieve a combination of good IR blockage and at the same time reduced or relatively low visible reflectance.

In view of the above, it will be apparent to those skilled in the art that there exists a need in the art for a coated article having one or more of desirable visible transmission, desirable color, low reflectance, low emissivity (or emittance), and/or low sheet resistance ($R_s$). In certain example embodiments, it will be apparent that there exists a need in the art for a coated article (e.g., for use in an IG window unit) which can achieve a combination of desirable color (e.g., desired a* and/or b* values), fairly low visible reflectance, low emissivity and/or sheet resistance, and desired visible transmission.

BRIEF SUMMARY OF THE INVENTION

A coated article including a low-E coating supported by a substrate (e.g., glass substrate) is provided in certain example embodiments of this invention. In certain example embodiments, the coated article has one or more of desirable visible transmission, desirable color, low reflectance, low emissivity (or emittance), and/or low sheet resistance ($R_s$). In certain example embodiments, the coated article (e.g., for use in an IG window unit) can achieve a combination of desirable color (e.g., desired reflective a* and/or b* values), fairly low visible reflectance, low emissivity and/or sheet resistance, and desired visible transmission. As used herein, a "coated article" can be or include a monolithic coated article and/or an IG unit.

In certain example embodiments of this invention, a color and/or reflectivity-adjusting absorber layer of the low-E coating is included in order to permit the coloration and/or reflectivity of the coating (and coated article) to be selectively controlled. The coated article may have a bronze, green, neutral, blue, or other color tint in different example embodiments. Glass side (or exterior) visible reflectance of the coated article may advantageously be reduced. In certain example embodiments, the absorber layer is included to form a coated article with color properties and/or reflectivity that are more easily controllable/tunable, and which may have a reduced glass side reflectance ($Y_g$ and/or $R_{out}$). Advantageously, inclusion of the color and/or reflectivity-adjusting absorber layer between dielectric layers, together with manipulating the thicknesses of other layer(s) present in the low-E coating, has been found to reduce glass side reflectance and produce tunable desirable tints such as bronze, green, neutral, and blue, while at the same time permitting a relatively thick IR reflecting layer to be utilized if desired. In other words, inclusion of a color and/or reflectivity-adjusting absorber layer has been found to provide tunable bronze, green, neutral, and/or blue tinted coated articles which indicates that desired color can be achieved, and/or allows a combination of acceptably low visible reflectance and low emissivity and/or sheet resistance.

Glass side (or exterior) color (e.g., $a^*_g$ and/or $b^*_g$ values) can be optimized based on the thickness and materials/composition of the individual layers in the low-E coating in certain example embodiments, which is advantageous from aesthetic and architectural perspectives. Additionally, good solar properties (e.g., low sheet resistance and acceptable visible transmission) are also possible in certain example embodiments of the coatings disclosed herein. It is noted that $a^*_g$ and $b^*_g$ color values herein refer to glass side reflective coloration, as viewed from the glass side of a monolithic coated article or from the side of an IG window unit adapted to face the exterior of the building or structure.

In certain example embodiments of this invention, there is provided a bronze colored coated article comprising a coating supported by a glass substrate, the coating comprising moving away from the glass substrate: a first dielectric layer comprising silicon nitride; a first contact layer; an IR reflecting layer comprising silver; a second contact layer, the first and second contact layers each directly contacting the IR reflecting layer; a second dielectric layer comprising silicon nitride; and wherein at least one of the first and second dielectric layers comprising silicon nitride is split by a substantially metallic absorber layer comprising NiCr and/or NbZr so as to have first and second spaced apart layer portions comprising silicon nitride with the substantially metallic absorber layer comprising NiCr and/or NbZr directly therebetween, the absorber layer being provided so that coated article is bronze colored.

In certain example embodiments of this invention, there is provided a bronze colored insulating glass (IG) window unit including first and second glass substrates and a coating supported by at least the first glass substrate, the coating comprising moving away from the first glass substrate: a first dielectric layer; a color and/or reflectivity-adjusting absorber layer; a second dielectric layer; a first contact layer; an IR reflecting layer comprising silver; a second contact layer; and a third dielectric layer, wherein the IG unit has a visible transmission of from about 20 to 50%, an $a^*_g$ of from about 0 to 3.0, a $b^*_g$ of from about 0.0 to 3.0, and a glass side visible reflectance (Y) of no more than about 16%.

In other example embodiments of this invention, there is provided a bronze colored insulating glass (IG) window unit including first and second glass substrates and a coating supported by at least the first glass substrate, the coating comprising moving away from the first glass substrate: a first dielectric layer; a color and/or reflectivity-adjusting absorber layer comprising Nb and/or Zr; a second dielectric layer; a first contact layer; an IR reflecting layer comprising silver; a second contact layer; and a third dielectric layer.

In still further embodiments of this invention, there is provided a bronze colored insulating glass (IG) window unit including first and second glass substrates and a coating supported by at least the first glass substrate, the coating comprising moving away from the first glass substrate: a first dielectric layer; a first contact layer; an IR reflecting layer comprising silver; a second contact layer; a second dielectric layer; a color and/or reflectivity-adjusting absorber layer; and a third dielectric layer, wherein the IG unit has a visible transmission of from about 20 to 50%, an $a^*_g$ (glass side) of from about 0 to 3.0, a $b^*_g$ (glass side) of from about 0.0 to 3.0, and a glass side visible reflectance (Y) of no more than about 16%.

DETAILED DESCRIPTION OF THE INVENTION

Figure 1:
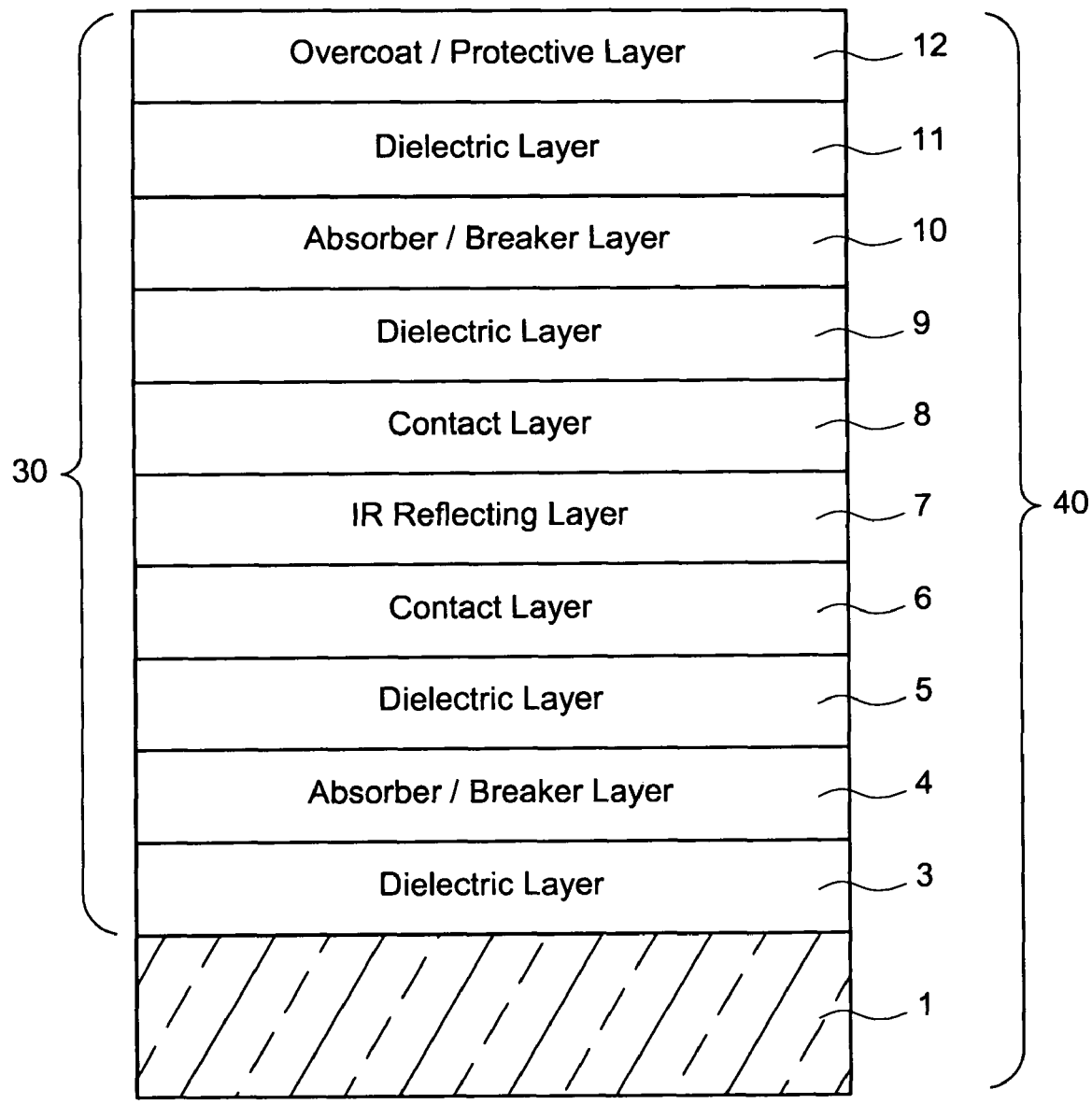
FIG. 1 is a cross sectional view of a coated article according to an example embodiment of this invention.

Coated articles according to example embodiments of this invention may be used in applications such as IG window units, vehicle windows, monolithic architectural windows, residential windows, and/or any other suitable application that includes single or multiple glass substrates. Like reference numerals in the various figures refer to like parts/layers herein.

Sheet resistance ($R_s$) is indicative of emissivity or emittance. Low sheet resistance is achieved in certain example embodiments of this invention, in combination with desired color and reflectance values, due to the present of the absorber layer(s). In certain example embodiments of this invention, a coated article realizes a sheet resistance ($R_s$) of no greater than about 10.0 ohms/square, more preferably no greater than about 9.0 ohms/square, even more preferably no greater than about 5.0 ohms/square, even more preferably no greater than about 4.0 ohms/square, and possibly or most preferably less than or equal to about 3.5 ohms/square. These sheet resistance values, applicable to any embodiment of this invention, may be before and/or after optional heat treatment such as thermal tempering of the coated article. In certain exemplary embodiments, a sheet resistance of no greater than 3.0 ohms/square may be possible. Low sheet resistance values are indicative of low emissivity.

In certain example embodiments of this invention, a low-E coating comprises a single IR reflecting layer comprising silver and/or gold, although this invention is not so limited in all instances. While other numbers of IR reflecting layers may sometimes be provided, the use of one is preferable in certain instances in that low-emittance can be achieved and more such layers are not required thereby making coatings easier and cost effective to manufacture and less susceptible to yield problems.

In certain example embodiments of this invention (e.g., see FIGS. 1-5), coated articles may or may not be heat treated (e.g., thermally tempered). In certain example embodiments (e.g., see FIGS. 1-5), coated articles may have an emissivity (normal and/or hemispherical) of no more than about 0.12, 0.11, and/or 0.10, more preferably no more than about 0.06, even more preferably no more than about 0.05, and most preferably no more than about 0.04 (e.g., 0.037). In certain example embodiments, following heat treatment and as measured in monolithic form, coated articles (e.g., see FIGS. 1-5) before and/or after HT are capable of realizing a visible transmission (Ill. C, 2 degree) of up to about 60%, more preferably up to about 50%, and most preferably no higher than 45% or 40%. In certain example embodiments, the coated article has a visible transmission of from about 20-50%, more preferably from about 30-48%, in monolithic and/or IG unit form.

Solar factor (SF, or g-value), calculated in accordance with EN standard 410, relates to a ratio between the total energy entering a room or the like through a glazing and the incident solar energy. Thus, it will be appreciated that lower SF values are indicative of good solar protection against undesirable heating of rooms or the like protected by windows/glazings. For example, a low SF value is indicative of a coated article (e.g., IG unit such as a double or triple glazing) that is capable of keeping a room fairly cool in summertime months during hot ambient conditions.

While low SF values are typically desirable for coated articles such as IG window units, the achievement of lower SF values typically comes at the expense of visible transmission and/or coloration. It is often desirable, but difficult, to achieve a combination of an acceptable visible transmission, desirable glass side coloration, and a low SF value for a coated article such as an IG window unit or the like. In this regard, the ratio between visible transmission ($T_{vis}$) and SF is sometimes referred to as "selectivity." In other words, the "selectivity" of a coated article is defined by $T_{vis}$/SF. High selectivity values are often desirable, because this combines high or desirable visible transmission with a low SF value which is indicative of good IR blockage.

In certain example embodiments of this invention, a coated article is provided with a layer stack which may permit the coated article to achieve one or more of good selectivity ($T_{vis}$/SF), an acceptable solar factor (SF), and/or low emissivity. One, two, three, or all of these features may be achieved in different embodiments of this invention (e.g., see FIGS. 1-5). When good selectivity ($T_{vis}$/SF) is achieved, there is provided a higher ratio of visible transmission ($T_{vis}$) to solar factor (SF), which will be appreciated by those skilled in the art.

In certain example embodiments of this invention (e.g., see FIGS. 1-5), a coated article such as an IG window unit realizes a selectivity value ($T_{vis}$/SF) of at least about 1.12 or 1.20, more preferably of at least about 1.30, even more preferably of at least about 1.35, and in certain instances at least about 1.40 or 1.43. In certain example embodiments of this invention, good selectivity is achieved without sacrificing SF values. In other words, good selectivity values are achieved in combination with rather low SF values. In certain example embodiments of this invention, coated articles realize a good selectivity value, in combination with a SF of no greater than 31, and more preferably a SF of no greater than about 30, even more preferably a SF of no greater than about 29, and even more preferably a SF of no greater than about 28. This permits coated articles and/or IG window units, for example, to realize desirable visible transmission while at the same time blocking significant undesirable radiation (e.g., IR) from reaching a building interior or the like.

In certain example embodiments of this invention, coated articles having a single IR reflecting layer are capable of having a reduced glass side reflectance. In certain example embodiments, before and/or after HT, coated articles such as IG window units according to certain example embodiments of this invention have a glass side reflectance (Y) of no more than about 16%, more preferably about 15% or less, even more preferably about 14% or less, while maintaining a desirable color.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article and/or IG unit may or may not be heat treated in different embodiments of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, and low-E coating (or layer system) 30 provided on the substrate 1 either directly or indirectly. The coating (or layer system) 30 includes, for example: bottom dielectric layer 3 which may be silicon nitride (e.g., $Si_xN_y$ and/or $Si_3N_4$), silicon oxide and/or silicon oxynitride in different embodiments of this invention, metallic or substantially metallic color and/or reflectivity-adjusting absorber layer 4 (e.g., of or including one or more of Ni, Cr, NiCr, Nb, Zr, NbZr, Si, Ti, Zn, Sn, Cu, Al, V, Mn, Mo, Pd, Ta, W, In, InSn, and/or stainless steel, and/or a mixture (alloy) thereof; the foregoing materials may be partially and/or fully oxided and/or nitrided), dielectric layer 5 which may be of or include silicon nitride (e.g., $Si_xN_y$ and/or $Si_3N_4$), silicon oxide and/or silicon oxynitride in different embodiments of this invention (and which may be of a substantially similar or the same material and/or composition as layer 3 in certain embodiments), lower contact layer 6 (which contacts bottom IR reflecting layer 7), conductive and preferably metallic or substantially metallic infrared (IR) reflecting layer 7, upper contact layer 8, dielectric layer 9, color and/or reflectivity-adjusting absorber layer 10 (e.g., of or including one or more of Ni, Cr, NiCr, Nb, Zr, NbZr, Si, Ti, Zn, Sn, Cu, Al, V, Mn, Mo, Pd, Ta, W, In, InSn, and/or stainless steel, and/or a mixture (alloy) thereof; the foregoing materials may be partially and/or fully oxided and/or nitrided), dielectric layer 11, and overcoat layer 12. Like layers 3 and 5, layers 9 and 11 may be of the same material and/or composition in certain example embodiments, so that the dielectric layers are split by the interposed absorber layer. It is noted that all of the foregoing layers may or may not be included in the low-E coating 30 in certain example embodiments. In particular, only one of the color and/or reflectivity-adjusting absorber layers 4, 10 may be present in some embodiments (e.g., see FIGS. 3(a) and 3(b)), or both may be present (e.g., see FIG. 1, FIG. 4(c), and FIG. 5(c)). The "contact" layers 6 and 8 each contact the IR reflecting layer 7 (e.g., layer based on Ag). The aforesaid layers 3-12 make up low-E (i.e., low emissivity) coating 30 that is provided on glass or plastic substrate 1. Additional layers may also be provided.

In monolithic instances, the coated article includes only one glass substrate 1 as illustrated in FIG. 1. However, monolithic coated articles herein may be used in devices such as laminated vehicle windshields, IG window units, and the like.

Figure 2:
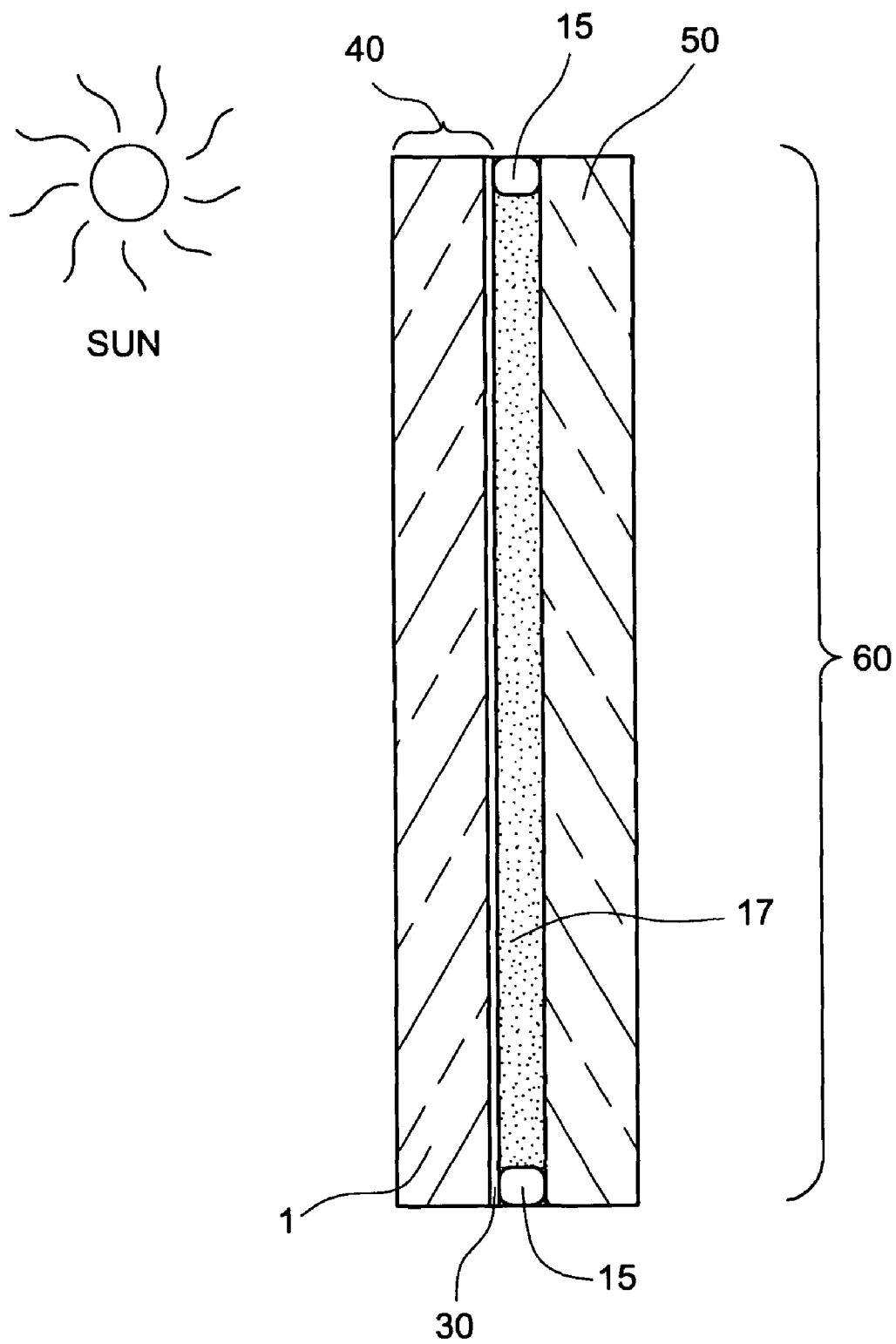
FIG. 2 is a cross sectional view of an insulating glass (IG) unit, which may include the coated article of any of FIG. 1 or 3-5.

FIG. 2 is a cross sectional view of an IG window unit, showing that the coating 30 may be provided on the interior side of the glass substrate 1. However, the invention is not so limited, and it is noted that coating 30 may be provided on either glass substrate, preferably on the side of the substrate closest to the gap 17.

As FIG. 2 depicts, an IG window unit may include two spaced apart glass substrates 1 and 50. An example IG window unit is illustrated and described, for example, in U.S. Patent Document No. 2004/0005467, the disclosure of which is hereby incorporated herein by reference. An example IG window unit may include, for example, the coated glass substrate 40 shown in FIG. 1 (or any of FIGS. 3-5) coupled to another glass substrate 50 via spacer(s), sealant(s) or the like (15), with a gap 17 being defined therebetween. This gap 17 between the substrates in IG unit embodiments may in certain instances be filled with a gas such as argon (Ar). An example IG unit may comprise a pair of spaced apart clear glass substrates each about 3-4 mm thick, one of which is coated with a low-E coating 30 herein in certain example instances, where the gap between the substrates may be from about 5 to 30 mm, more preferably from about 10 to 20 mm, and most preferably about 16 mm. In certain embodiments, the coating 30 is provided on the interior of the outermost (e.g., closest to the outside) glass substrate 1 as shown in FIG. 2. However, in other embodiments, the coating 30 may be provided on the interior surface of either substrate facing the gap. An IG unit may also include additional substrate(s), such as three glass substrates, in certain instances.

Figure 3A:
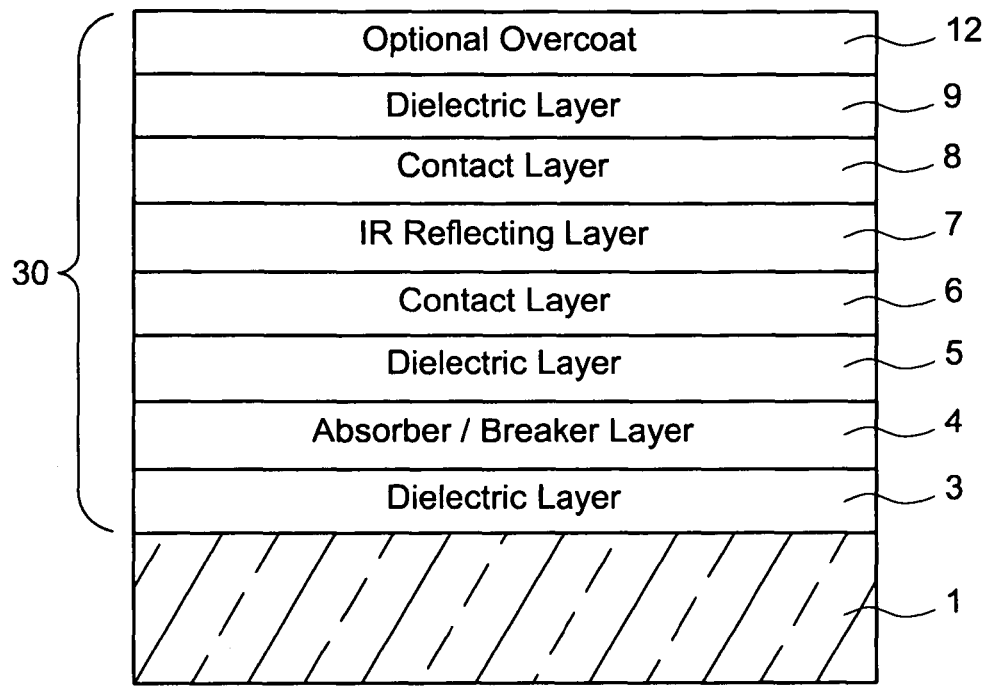
FIGS. 3(a) and 3(b) are cross sectional views of coated articles according to other example embodiments of this invention.
Figure 3B:
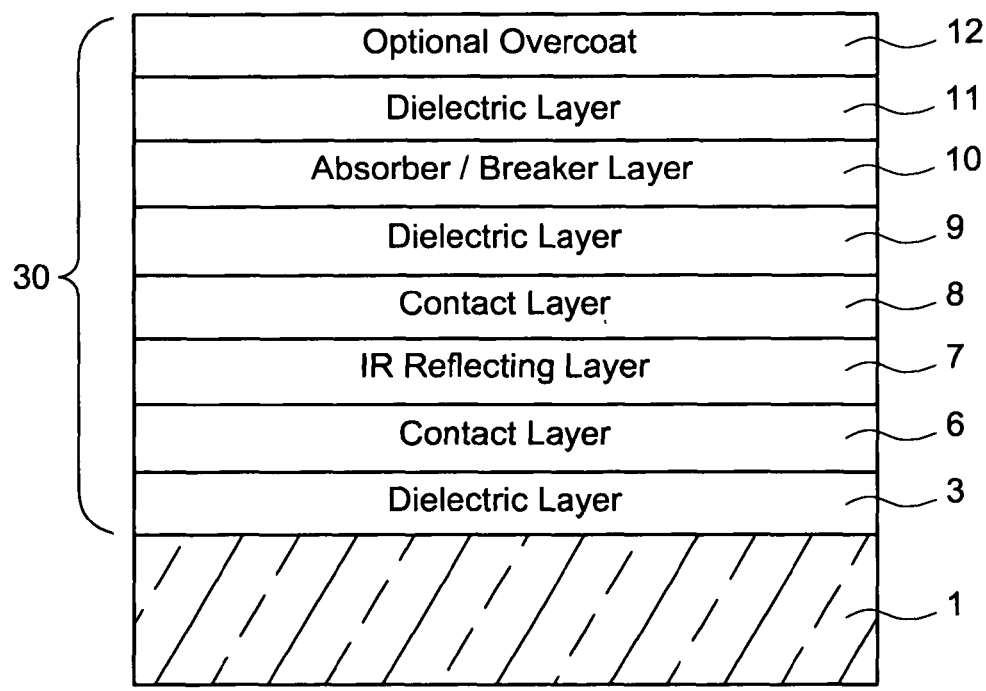
Figure 4A:
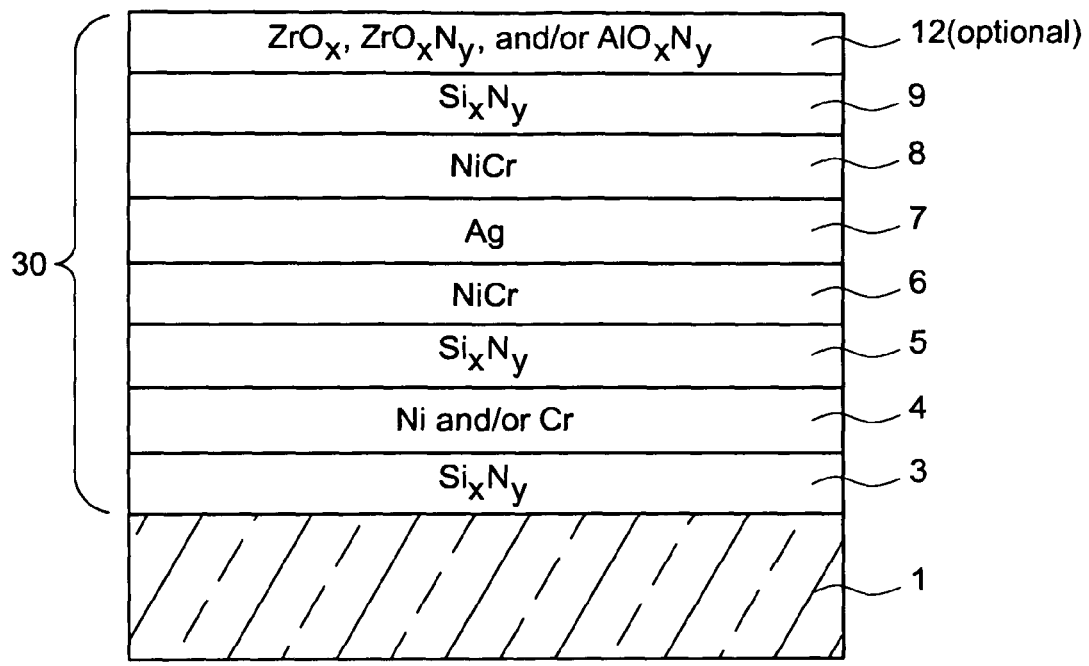
FIGS. 4(a), 4(b), and 4(c) are cross sectional views of coated articles according to further example embodiments of this invention.
Figure 4B:
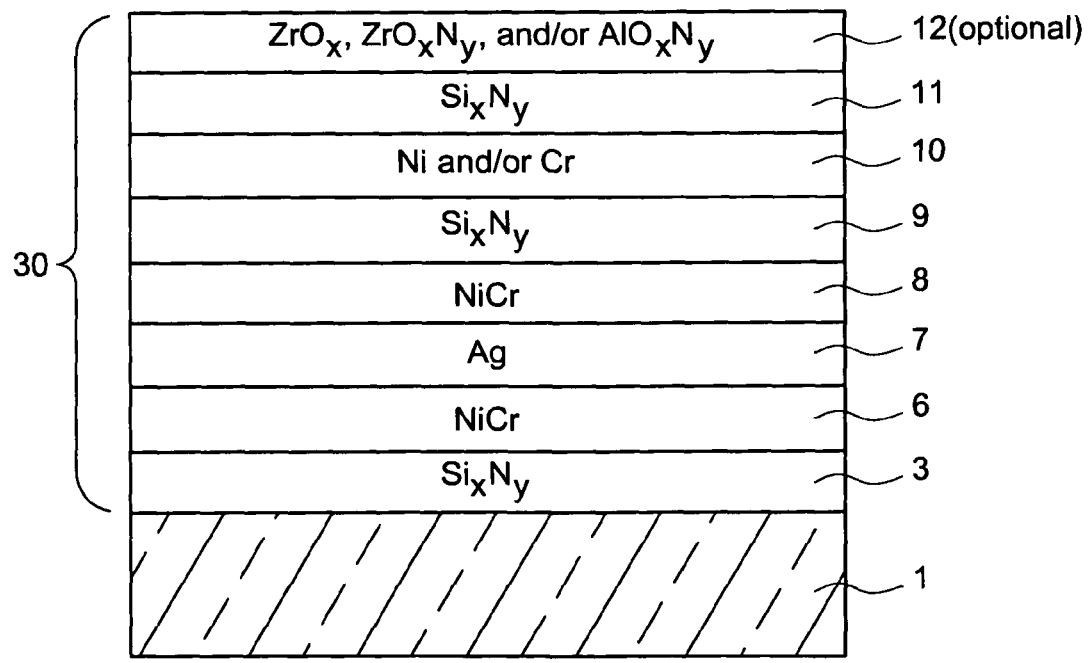
Figure 4C:
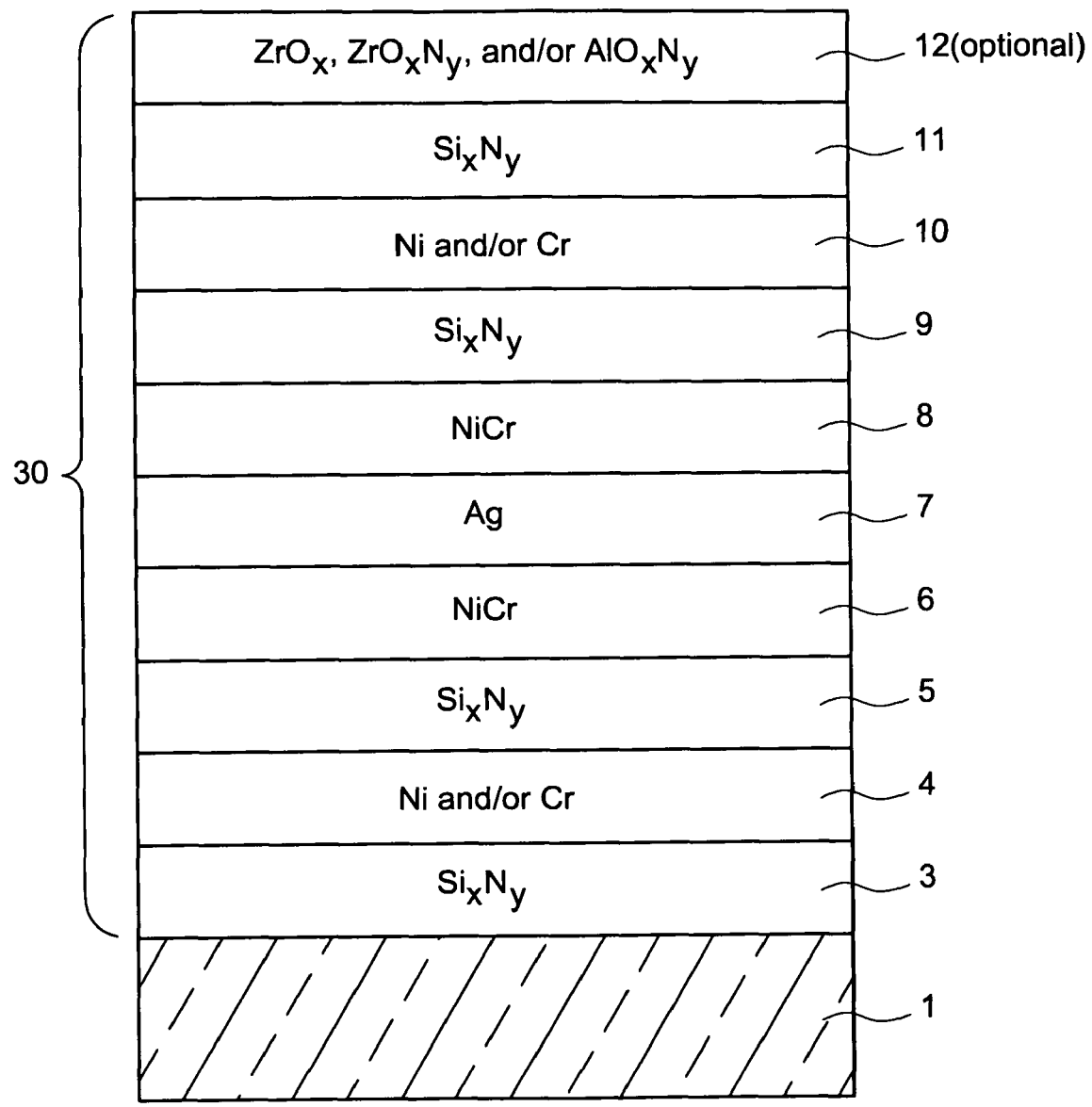
Figure 5A:
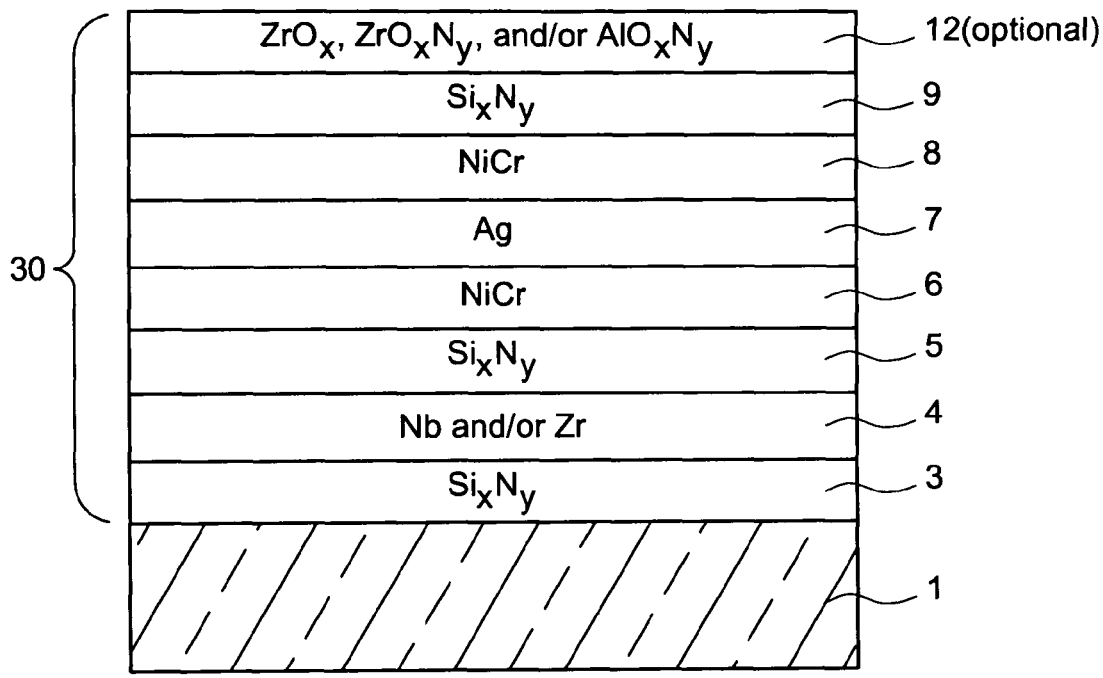
FIGS. 5(a), 5(b), and 5(c) are cross sectional views of coated articles according to still further example embodiments of this invention.
Figure 5B:
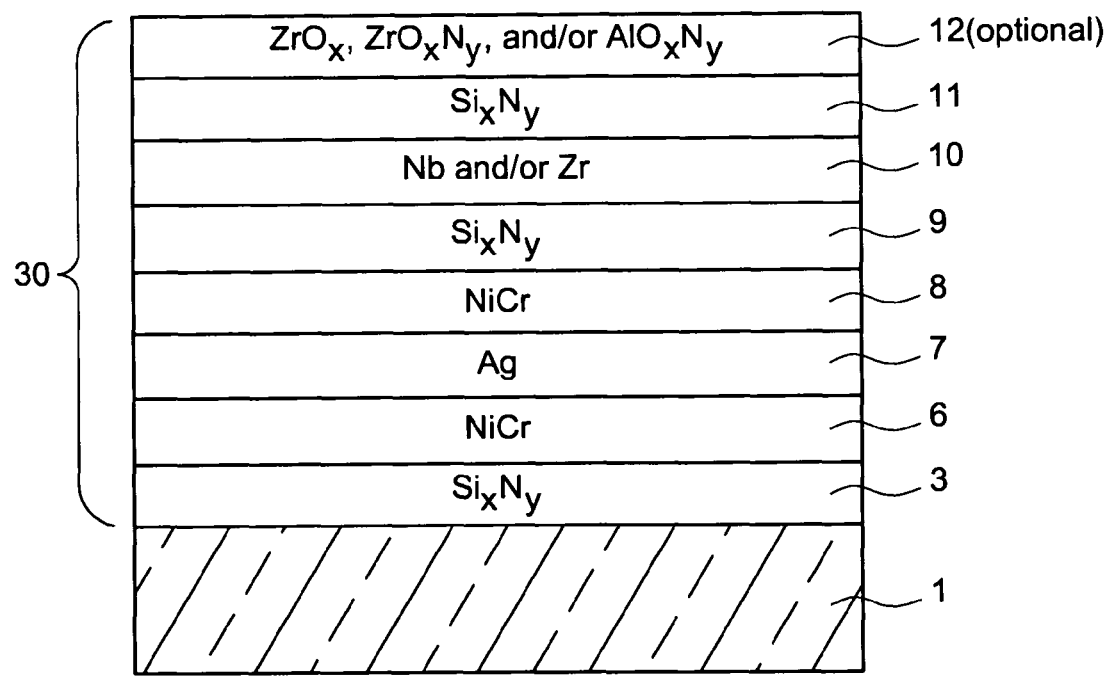
Figure 5C:
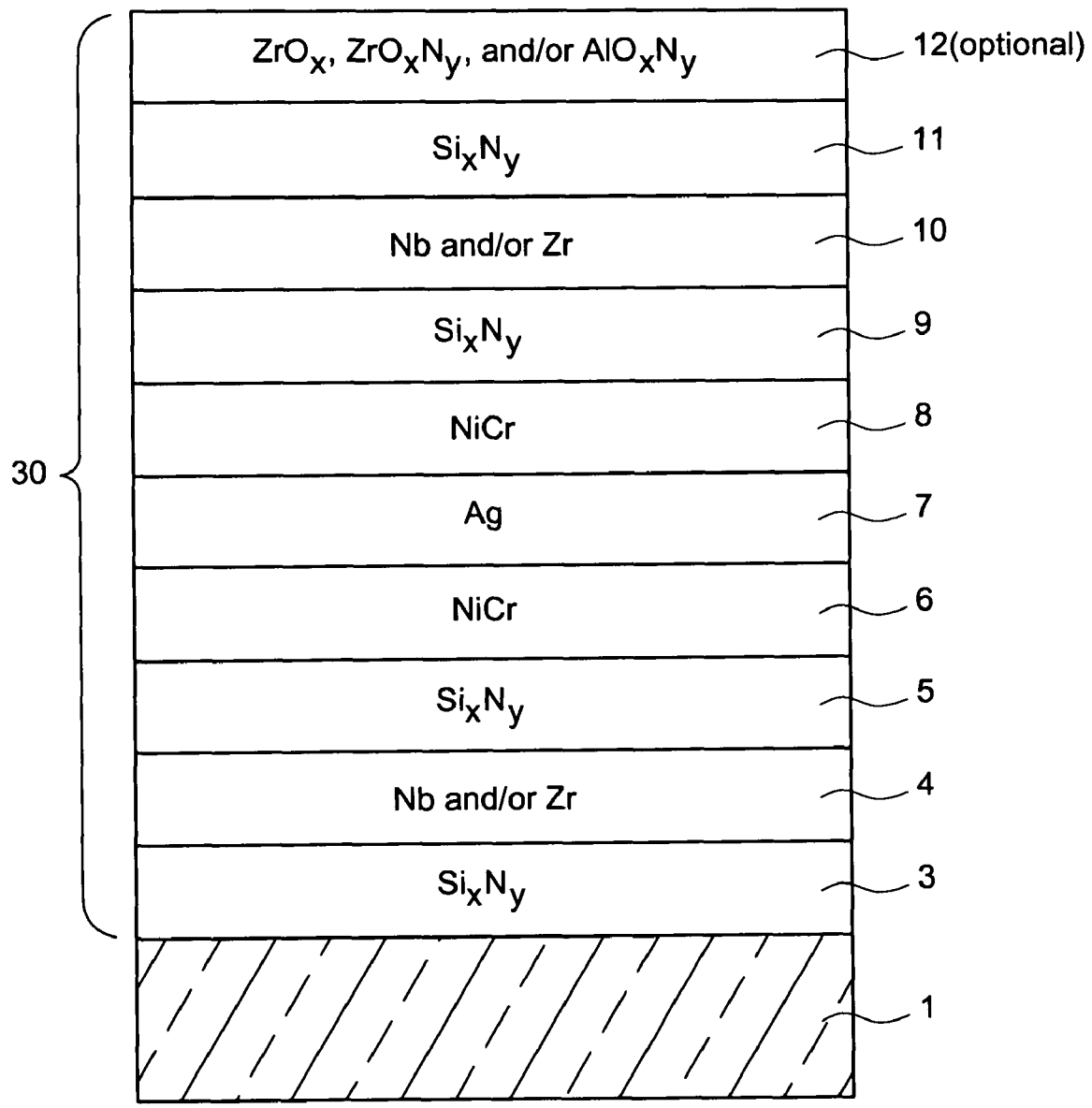

FIGS. 3-5 show other example embodiments of this invention, the coatings of which may be used in connection with FIGS. 1 and/or 2.

It has advantageously been found that including a color and/or reflectivity adjusting absorber layer (4 and/or 10) of varying thicknesses into the above-mentioned layer stack (e.g., see FIGS. 1-5) in one or more places can result in desirable optical qualities. More specifically, in certain example embodiments, by adjusting the thickness of the color and/or reflectivity adjusting absorber layer(s) 4 and/or 10, the glass side coloring of the coated article (the glass side $a^*_g$ and $b^*_g$ values) can be tuned so as to appear to be a certain color when the window unit is viewed from the outside. The absorber layer(s) 4 and/or 10 may be conductive in certain example instances. Unless stated otherwise, the $a^*_g$ and $b^*_g$ values herein refer to glass side reflective coloration, as viewed from the glass side of a monolithic coated article or from the side of an IG window unit adapted to face the exterior of the building or structure. Likewise, glass side visible reflectance (Y) refers to glass side visible reflection, as viewed from the glass side of a monolithic coated article or from the side of an IG window unit adapted to face the exterior of the building or structure.

More particularly, in certain example embodiments, including absorber layer 4 between two dielectric layers 3 and 5 can result in a coated article that has desirable optical qualities. In certain example embodiments, dielectric layers 3 and 5 comprise the same or substantially similar materials/composition. In effect, in certain example embodiments, a silicon-based layer is split into two layers, 3 and 5, and a color and/or reflectivity adjusting absorber layer is provided between the two dielectric layers. Layers 3 and 5 may be different thicknesses is certain example embodiments. In other embodiments, layers 3 and 5 may have substantially the same thickness. The thicknesses of layers 3 and 5 can be altered to contribute to achieving a desirable glass side color (e.g., desirable $a^*_g$ and $b^*_g$ values). The "desirable" glass side color may be different in certain instances.

In certain example embodiments, the glass-side color of the coated article (a* and b* for the glass side) can be bronze, green, neutral, or blue. Thus, a coating 30 can be applied on a clear glass substrate 1, and the coated article (monolithically, or when measured as an IG unit) will have the appearance of being colored while still having desirable characteristics such as those of a traditional low-e coating, such as a sheet resistance ($R_s$) of no greater than about 10.0 ohms/square, 9.5 ohms/square, or 9.0 ohms/square, more preferably no greater than about 5.0 ohms/square, even more preferably no greater than about 4.0 ohms/square, and most preferably less than or equal to about 3.5 ohms/square before and/or after optional heat treatment such as tempering, an emissivity of under about 0.12, 0.11, and/or 0.11, more preferably under about 0.06, even more preferably under about 0.05, and most preferably under about 0.04 (e.g., 0.032). The resulting coated article may have a reduced glass side (or building exterior) reflectance (Y) of 16% or less, more preferably about 14% or less (e.g., IG unit) in certain example embodiments, depending in part upon the color desired.

In certain example embodiments, depending in part on the material chosen for absorber layer(s) 4 and/or 10, and the thicknesses and materials of layers 3-12, a coating made according to certain example embodiments may be provided on a clear glass substrate, giving the glass substrate a desired colored (e.g., bronze color) appearance. For example, a coating 30 may produce a coated article that, when viewed from the glass side (or building exterior in FIG. 2), in certain example embodiments, has a tint that is bronze, neutral, green, royal blue, and/or other colors made from combinations thereof.

The absorber layer(s) is/are advantageous because the glass side and/or outside reflectance is lowered, and desirable visible transmission, color, and low SF can be achieved, without sacrificing sheet resistance. For example, and without limitation, it is often more aesthetically pleasing when a structure such as a building has windows with a lower glass side reflectance. Architects may thus prefer the glass side (or exterior) visible reflectance to be lower, but may not want to sacrifice sheet resistance, color and/or visible transmission to this end. In certain example embodiments, the thickness of the IR reflecting layer(s) 7, which may comprise silver or gold, may be increased. Increasing the thickness of layer 7 can increase the glass side reflectance; thus, if glass side reflectance is lowered by the inclusion of absorber layer(s) 4 and/or 10, but increased by thickening layer 7, the net change in glass side reflectance may be minimal or even zero or substantially zero. Increasing the thickness of IR reflecting layer 7 is desirable because it enhances the IG unit's ability to block/reflect IR radiation, which would reduce the amount of IR radiation entering a building, structure, vehicle, etc, through the window.

In certain example embodiments, the layers 3-12 are sputtered onto a glass substrate. This may be applicable to any of FIGS. 1-5. The sputtering target(s) may be planar or rotating cylindrical magnetron sputtering targets (not shown) in example embodiments of this invention. Metal and/or ceramic targets may be used.

Referring to FIGS. 1-5, dielectric layers 3 and 5 may comprise silicon nitride, and in other example embodiments, may comprise silicon oxide, and/or silicon oxynitride. Layers 3 and 5 may be fully or partially oxided and/or nitrided. In certain example embodiments, dielectric layers 3 and 5 may comprise the same or substantially similar materials and/or composition. In certain embodiments, the thickness of layers 3 and 5 may be the same or substantially similar. In other embodiments, one of the layers 3 or 5 may be thicker than the other layer 3 or 5. Layers 3 and 5 may each be from about 70 to 1200 Å thick in certain example embodiments. In certain example embodiments, only one of layers 3 and 5 may be present; however, in other embodiments, both layers 3, 5 may be provided.

Layer 4 may be a color and/or reflectivity adjusting absorber layer in certain example embodiments. Absorber layer 4 may be of or include any one of the following materials, or a mixture (alloy) of any of the materials: Ni, Cr, NiCr, Nb, Zr, NbZr, Si, Ti, Zn, Sn, Cu, Al, V, Mn, Mo, Pd, Ta, W, In, InSn, and/or stainless steel. The materials can optionally be partially or fully oxided and/or nitrided. Absorber layer 4 may preferably comprise or consist essentially of Ni, Cr, NiCr, Nb, Zr, NbZr, and/or oxides and/or nitrides thereof. Layer 4 may be from about 10 to 150 Å thick in certain example embodiments, more preferably from about 20-70 Å thick. However, in other embodiments, layer 4 may be thicker, sometimes significantly, than 150 Å.

Still referring to FIGS. 1-5, contact layers 6 and 8 may comprise Ni, Cr, and/or NiCr, or oxides thereof, in certain example embodiments. Other suitable materials may instead or also be used. Contact layers 6 and 8 may be partially or fully oxided and/or partially or fully nitrided in certain example instances. In certain example embodiments, layers 6 and 8 may help protect IR reflecting layer 7 from becoming oxided during deposition of other layers and/or during heat treatment. Contact layers 6 and 8 may each be from about 10 to 150 Å thick in certain example embodiments, more preferably from about 10-60 Å thick.

Continuing to refer to FIGS. 1-5, dielectric layers 9 and 11 may comprise or consist essentially of silicon nitride, and in other example embodiments, may comprise or consist essentially of silicon oxide and/or silicon oxynitride. Layers 9 and 11 may be fully or partially oxided and/or nitrided. In certain example embodiments, dielectric layers 9 and 11 may comprise the same or substantially similar materials and/or composition. It is noted that all silicon nitride, silicon oxynitride, and/or silicon oxide layers herein (e.g., see 3, 5, 9, and/or 11) may optionally be doped with aluminum (e.g., 1-5%), stainless steel, or the like. In certain embodiments, the thickness of dielectric layers 9 and 11 may be the same or substantially similar. Layers 9 and 11 may each be from about 70 to 1200 Å in certain example embodiments. In certain example embodiments, only one of layers 9 and 11 may be present; however, in other embodiments, both layers may be provided.

Layer 10 may be a color and/or reflectivity adjusting absorber layer in certain example embodiments (e.g., see FIGS. 1-5). With respect to absorber layers 4, 10, a layer stack may comprise layers 4 and 10, layer 4 only, or layer 10 only.

Layer 10 may be of or include any one of the following materials, or a mixture (alloy) of any of these materials: Ni, Cr, NiCr, Nb, Zr, NbZr, Si, Ti, Zn, Sn, Cu, Al, V, Mn, Mo, Pd, Ta, W, In, InSn, and/or stainless steel. The materials can be partially or fully oxided and/or nitrided. Layer 10 may preferably comprise or consist essentially of Ni, Cr, NiCr, Nb, Zr, NbZr, and/or oxides and/or nitrides thereof. Absorber layer 10 may be from about 10 to 150 Å thick in certain example embodiments. However, in other embodiments, absorber layer 10 may be thicker than 150 Å. Layer 10 may not be included in certain embodiments, or may be included instead of layer 4, or both layers may be present.

Layer 12 is an optional overcoat. Layer 12 may be provided over the IR reflecting layer 7 and over dielectric layer(s) 9, 11. Layer 12 may comprise an oxide, nitride, and/or oxynitride of zirconium and/or aluminum (e.g., $ZrO_x$, $ZrO_xN_y$, and/or $AlO_xN_y$) in certain example embodiments of this invention.

The coated article made according to the above embodiments (e.g., see FIGS. 1-5) may be used in an IG unit (e.g., see FIG. 2). The IG unit may or may not be a vacuum IG unit. In other example embodiments, the coated article may be used as a monolithic window unit.

A coated article and/or IG unit made according to the above embodiments is advantageous in that it may lower the glass side reflectance due to absorbing properties of the color and/or reflectivity adjusting absorber layer(s). In certain example embodiments, it may be possible to achieve a better selectivity at a given glass side reflectance by increasing the thickness of the IR reflecting (e.g., silver-based) layer 7. A coated article and/or IG unit made according to certain example embodiments of this invention may also have improved thermal, mechanical, and chemical durability as compared to split-silver reflective coatings.

Coated articles with a neutral, green, blue, bronze, gold, etc. glass side reflectance colors are possible to achieve. It has been found that coated articles and/or IG units made according to certain example embodiments of this invention may have the lower glass side (or exterior) reflectance of a "split silver" (or double silver) coating with the color variety of a coated article containing a single IR reflecting layer.

In certain example embodiments, the desired glass side reflectance and transmission color can be combined to a desirable film side reflectance color, including a lower film side reflectance. The inclusion of layers 4 and/or 10 in a low-E layer stack allows the color, reflectivity, and solar performance of the coated article to be balanced and tuned.

Coated articles made according to the embodiments herein are advantageous in that clear glass 1 can be provided with a coating 30 that provides the appearance of a body-tinted glass—but the glass substrate 1 may in fact be clear or substantially clear in color by itself. By reducing the glass side/outside reflectance with a color and/or reflectivity-adjusting absorber layer (4 and/or 10), a thicker IR reflecting layer 7 is possible. Normally a thicker IR reflecting layer increases the glass side reflectance, but the absorber layer(s) allows the thicker IR reflecting layer 7 without a significant increase in glass side reflectance.

Example embodiments with bronze color (e.g., glass side reflective color) are described above—see FIGS. 1-5. This section is in addition to the above with respect to bronze colored embodiments. A bronze-tinted coated article may have a visible transmission of from about 10 to 55%, more preferably from about 20 to 50%, and most preferably, from about 30 to 48%. An IG unit including a bronze-tinted coated article may even have a visible transmission of no greater than about 43%. When the desired tint of a coated article and/or IG unit is bronze, layers 4 and/or 10 may comprise or consist essentially of Ni and/or Cr. However, a nitride and/or oxynitride of nickel chromium may be used for layers 4 and/or 10 as well. Nb, Zr, and/or NbZr may also be used in certain example embodiments for absorber layer 4 and/or 10. An oxide and/or oxynitride of Nb, Zr, and/or NbZr may also be used. In a bronze-tinted coated article and/or IG unit, in certain example embodiments, layer 10 may not be present. In different example embodiments, layer 10 may be present while layer 4 is not. In other embodiments, however, layers 4 and/or 10 may both be included in the coating. Layers 4 and/or 10 may be fully or partially nitrided and/or oxided. Layers 4 and/or 10 in certain embodiments of a bronze-tinted coated article and/or IG unit may be from about 10 to 150 Å, more preferably from about 25 to 75 Å, and most preferably from about 30 to 70 Å. In a bronze-tinted coated article and/or IG unit, dielectric layers 3 and/or 5 may comprise silicon nitride and/or silicon oxynitride in certain embodiments. Layer 3 may be from about 70 to 1200 Å, more preferably from about 80 to 200 Å, and most preferably from about 120 to 160 Å. Layer 5 may be from about 70 to 1200 Å, more preferably from about 200 to 440 Å, and most preferably from about 260 to 380 Å. However, in certain example embodiments, layers 3 and 5 may have a similar or substantially the same thickness. Layers 6 and/or 8 in certain example embodiments of a bronze-tinted coated article and/or IG unit may comprise an oxide, nitride, and/or oxynitride of nickel chromium. In some embodiments, layers 6 and 8 may be of a similar thickness. However, the invention is not so limited. An example thickness for layers 6 and 8 is from about 10 to 150 Å, more preferably from about 15 to 75 Å, and most preferably from about 20 to 60 Å. IR reflecting layer 7 may comprise silver and/or gold in certain example embodiments. The thickness of layer 7 may be from about 100 to 170 Å, more preferably from about 110 to 160 Å, and most preferably from 115 to 155 Å.

Layers 9, 10, and/or 11 are optional in certain embodiments. In certain example embodiments, there may only be one of layers 9 and 11, and layer 10 may not be included. Other embodiments may have all three of layers 9, 10, and 11. In different embodiments, layers 9, 10 and/or 11 may be present, and layers 3, 4 and/or 5 may not be.

When layers 10 and 11 are not included, in certain embodiments, layer 9 may be from about 70 to 1200 Å, more preferably from about 100 to about 900 Å, and most preferably, from about 300 to 700 Å. When layers 10 and 11 are included, layers 9 and/or 11 may be from about 70 to 1200 Å. In certain example embodiments of a bronze-tinted coated article and/or IG unit, layers 10 and 11 may not be included in the coating.

Layer 12 may be provided over the outermost layer in certain example embodiments. Layer 12 may enhance mechanical and/or chemical durability of a coated article made according to example embodiments. Layer 12 may comprise an oxide, nitride, and/or oxynitride of aluminum and/or zirconium. Layer 12 may be partially and/or fully oxided or nitrided. Layer 12 may be from about 10 to 60 Angstroms in certain embodiments. This thickness is not limiting, however, and layer 12 may be thicker or thinner in other embodiments.

Example materials and thicknesses for layers, for FIG. 3(a) embodiments such as bronze colored embodiments, are set forth below in Table 1.

TABLE 1

Example Materials/Thicknesses; FIG. 3(a) Embodiment

| Layer<br>Glass (1-10 mm thick) | Preferred Range (Å) | Most Preferred (Å) | Example (Å) |
|---|---|---|---|
| $Si_xN_y$ (layer 3) | 70-1200 Å | 120-160 Å | 140 Å |
| $NiCrN_x$ (layer 4) | 10-150 Å | 30-70 Å | 50 Å |
| $Si_xN_y$ (layer 5) | 70-1200 Å | 260-380 Å | 320 Å |
| NiCr (layer 6) | 10-150 Å | 20-50 Å | 30 Å |
| Ag (layer 7) | 100-170 Å | 115-155 Å | 130 Å |
| NiCr (layer 8) | 10-150 Å | 20-50 Å | 30 Å |
| $Si_xN_y$ (layer 9) | 70 to 1200 Å | 300-700 Å | 480 Å |

In certain example embodiments of this invention, coated articles herein may have the following optical and solar characteristics set forth in Table 2 when measured monolithically (before or after any optional HT).

TABLE 2

Optical/Solar Characteristics (Monolithic)

| Characteristic | General | More Preferred | Most Preferred |
|---|---|---|---|
| $R_s$ (ohms/sq.): | <=5.0 | <=4.0 | <=3.5 |
| $E_n$: | <=0.06 | <=0.05 | <=0.04 |
| $T_{vis}$ (Ill. C. 2°): | <=55% | <=50% | <=48% |

Moreover, in certain example laminated embodiments of this invention, coated articles herein which have been optionally heat treated to an extent sufficient for tempering, and which have been coupled to another glass substrate to form an IG unit, may have the following IG unit optical/solar characteristics.

TABLE 3

Example Optical Features (Monolithic pre or post-HT)

| Characteristic | General | More Preferred |
|---|---|---|
| $T_{vis}$ (or TY)(Ill. C. 2°): | <=50% | <=48% |
| $R_gY$ (Ill. C., 2 deg.): | 5 to 20% | 9 to 13% |
| $a^*_g$ (Ill.C., 2°): | 0.0 to 3.0 | 1.0 to 2.5 |
| $b^*_g$ (Ill. C., 2°): | 0.0 to 3.0 | 1.0 to 2.5 |
| $L^*$ (Ill. C. 2°): | 26-52 | 36-43 |

TABLE 4

Example Optical Features (IG Unit pre or post-HT)

| Characteristic | General | More Preferred |
|---|---|---|
| $T_{vis}$ (or TY)(Ill. C. 2°): | <=50% | <=45% |
| $a^*_r$ (Ill. C. 2°): | -8.0 to 0.0 | -6.0 to -2.0 |
| $b^*_r$ (Ill. C. 2°): | 0.0 to 7.0 | 1.0 to 5.0 |
| $L^*$ (Ill. C. 2°): | <=77 | <=75 |
| $R_rY$ (Ill. C., 2 deg.): | 10 to 30% | 15 to 25% |
| $a^*_f$ (Ill. C., 2°): | 0.0 to 15.0 | 2.0 to 13.0 |
| $b^*_f$ (Ill. C., 2°): | -20.0 to -5.0 | -15.0 to -7.0 |
| $L^*$ (Ill. C. 2°): | 37-62 | 45-58 |
| $R_gY$ (Ill. C., 2 deg.): | 10 to 16% | 11 to 15% |
| $a^*_g$ (Ill. C., 2°): | -1.0 to 4.0 | 0.0 to 3.0 |
| $b^*_g$ (Ill. C., 2°): | 0.0 to 4.0 | 0.0 to 3.0 |
| $L^*$ (Ill. C. 2°): | 37-47 | 39-46 |

In certain example embodiments, an example layer stack such as in Table 1 may make it possible to reduce glass-side reflectance by about 50% (as compared to a coating that does not include an absorber layer(s)). The glass side reflectance may also appear less reddish.

Monolithically, a bronze-tinted coated article made according to the above embodiments may have a glass side reflectance Y of from about 5 to 20%, more preferably from about 9 to 15%, and most preferably from about 10 to 13% in certain example embodiments. These results are for a monolithic coated article.

In certain example embodiments, a bronze-tinted coated article (monolithically) may have an $a^*_g$ value of from about 0.0 to 3.0, more preferably from about 1.0 to 2.5, and most preferably from about 1.5 to 2.5. In certain example embodiments, a bronze-tinted coated article may have a $b^*_g$ value of from about 0.0 to 3.0, more preferably from about 1.0 to 2.5, and most preferably from about 1.5 to 2.5 (measured monolithically). In certain example embodiments, when measured monolithically, a bronze-tinted coated article may have a $L^*_g$ value of from about 34 to 47, more preferably from about 36 to 43, and most preferably from about 37 to 42.

In certain example embodiments, a bronze-tinted coated article (IG unit) may have an $a^*_g$ value of from about -1.0 to 4.0, more preferably from about 0.0 to 3.0, and most preferably from about 1.0 to 2.5. In certain example embodiments, a bronze-tinted coated article may have a $b^*_g$ value of from about 0.0 to 4.0, more preferably from about 0.0 to 3.0, and most preferably from about 1.0 to 2.5. In certain example embodiments, a bronze-tinted coated article may have a $L^*_g$ value of from about 37 to 47, more preferably from about 39 to 46, and most preferably from about 40 to 45.

In certain example embodiments, a bronze-tinted coated article may have a sheet resistance ($R_s$) of less than or equal to about 5.0 (more preferably less than or equal to about 4.0, most preferably less than or equal to about 3.5, and sometimes even less than or equal to about 3.0) before and/or after heat treatment. In certain example embodiments of this invention, a bronze-tinted coated article after heat treatment may have an emissivity of less than or equal to about 0.06, more preferably less than or equal to about 0.05, and most preferably less than or equal to about 0.04 (e.g., 0.037).

The selectivity of a bronze-tinted IG window unit/coated article may be at least about 1.20, more preferably at least about 1.30, even more preferably at least about 1.35 or 1.40, and even sometimes about 1.43. The Solar Factor (SF) may be from about 28 to 32.

The visible transmission of a bronze-tinted coated article (IG unit) may be from about 10 to 55%, more preferably from about 20 to 50%, and most preferably from about 30 to 45%. In certain example embodiments, the visible transmission may be no greater than 50%, and more preferably, no greater than 40%. In other example embodiments, the visible transmission of a bronze-tinted coated article in an IG unit may be from about 30 to 40%.

Example embodiments with green color (e.g., glass side reflective color) are described above—see FIGS. 1-5. This section is in addition to the above with respect to green colored embodiments.

A coated article comprising a green-tinted coated article may have a visible transmission of from about 10 to 55%, more preferably from about 20 to 50%, and most preferably, from about 30 to 48%. When the desired tint of a coated article and/or IG unit is green, layer 4 may comprise or consist essentially of Ni and/or Cr. However a nitride and/oxynitride of nickel chromium may be used for layers 4 and/or 10 as well. Nb, Zr, and/or NbZr may also be used in certain example embodiments for absorber layer 4 and/or 10. An oxide and/or oxynitride of Zb, Zr, and/or ZbZr may also be used. In a green-tinted coated article and/or IG unit, in certain example embodiments, layer 10 may not be present. In different example embodiments, layer 10 may be present while layer 4 is not. In other embodiments, however, layers 4 and/or 10 may both be included in the coating. Layers 4 and/or 10 may be fully or partially nitrided and/or oxided.

Layers 4 and/or 10 in certain embodiments of a green-tinted coated article and/or IG unit may be from about 10 to 150 Å, more preferably from about 25 to 75 Å, and most preferably from about 30 to 70 Å.

In a green-tinted coated article and/or IG unit, dielectric layers 3 and/or 5 may comprise silicon nitride and/or silicon oxynitride in certain embodiments. Layer 3 may be from about 70 to 1200 Å, more preferably from about 80 to 400 Å, and most preferably from about 160 to 400 Å. Layer 5 may be from about 70 to 1200 Å, more preferably from about 500 to 1200, and most preferably from about 890 to 1150 Å.

Layers 6 and/or 8 in certain example embodiments of a green-tinted coated article and/or IG unit may comprise an oxide, nitride, and/or oxynitride of nickel chromium. In some embodiments, layers 6 and 8 may be of a similar thickness. However, the invention is not so limited. An example thickness for layers 6 and 8 is from about 10 to 150 Å, more preferably from about 20 to 80 Å, and most preferably from about 25 to 75 Å.

In a green-tinted coated article and/or IG unit, IR reflecting layer 7 may comprise silver and/or gold in certain example embodiments. The thickness of layer 7 may be from about 100 to 170 Å, more preferably from about 110 to 160 Å, and most preferably from 115 to 155 Å.

Layers 9, 10, and/or 11 are optional in certain embodiments. In certain example embodiments, there may only be one of layers 9 and 11, and layer 10 may not be included. Other embodiments may have all three of layers 9, 10, and 11. In different embodiments, layers 9, 10 and/or 11 may be present, and layers 3, 4 and/or 5 may not be.

When layers 10 and 11 are not included, in certain embodiments, layer 9 may be from about 70 to 1200 Å, more preferably from about 100 to about 900 Å, and most preferably, from about 300 to 700 Å. When layers 10 and 11 are included, layers 9 and/or 11 may be from about 70 to 1200 Å. In certain example embodiments of a green-tinted coated article and/or IG unit, layers 10 and 11 may not be included in the coating.

Layer 12 may be provided over the outermost layer in certain example embodiments. Layer 12 may enhance mechanical and/or chemical durability of a coated article made according to example embodiments. Layer 12 may comprise an oxide, nitride, or oxynitride of zirconium or aluminum. Layer 12 may be partially and/or fully oxided or nitrided.

Example materials and thickness for layers for FIG. 3(a) embodiments such as green-colored embodiments are set forth below in Table 5.

TABLE 5

Example Materials/Thicknesses; FIG. 3(a) Embodiment

| Layer Glass (1-10 mm thick) | Preferred Range (Å) | Most Preferred (Å) | Example (Å) |
|---|---|---|---|
| $Si_xN_y$ (layer 3) | 70-1200 Å | 160-400 Å | 280 Å |
| $NiCrN_x$ (layer 4) | 10-150 Å | 30-70 Å | 50 Å |
| $Si_xN_y$ (layer 5) | 70-1200 Å | 890-1150 Å | 1020 Å |
| NiCr (layer 6) | 10-150 Å | 25-75 Å | 40 Å |
| Ag (layer 7) | 100-170 Å | 115-155 Å | 130 Å |
| NiCr (layer 8) | 10-150 Å | 25-75 Å | 40 Å |
| $Si_xN_y$ (layer 9) | 70 to 1200 Å | 300-700 Å | 510 Å |

In certain example embodiments of this invention, coated articles herein may have the following optical and solar characteristics set forth in Table 6 when measured monolithically (before or after any optional HT).

TABLE 6

Optical/Solar Characteristics (Monolithic)

| Characteristic | General | More Preferred | Most Preferred |
|---|---|---|---|
| $R_s$ (ohms/sq.): | <=6.0 | <=5.0 | <=4.0 |
| $E_n$: | <=0.12 | <=0.06 | <=0.05 |
| $T_{vis}$ (Ill. C. 2°): | <=55% | <=50% | <=48% |

Moreover, in certain example laminated embodiments of this invention, coated articles herein which have been optionally heat treated to an extent sufficient for tempering, and which have been coupled to another glass substrate to form an IG unit, may have the following IG unit optical/solar characteristics.

TABLE 7

Example Optical Features (Monolithic pre or post-HT)

| Characteristic | General | Most Preferred |
|---|---|---|
| $T_{vis}$ (or TY)(Ill. C. 2°): | <=55% | <=48% |
| $R_gY$ (Ill. C., 2 deg.): | 26 to 42% | 30 to 36% |
| $a^*_g$ (Ill. C., 2°): | −15.0 to −5.0 | −12.0 to −7.0 |
| $b^*_g$ (Ill. C., 2°): | −6.0 to 3.0 | −3.0 to 1.0 |
| L* (Ill. C. 2°): | 58-71 | 62-67 |

TABLE 8

Example Optical Features (IG Unit pre or post-HT)

| Characteristic | General | Most Preferred |
|---|---|---|
| $T_{vis}$ (or TY)(Ill. C. 2°): | <=50% | <=45% |
| $a^*_t$ (Ill. C. 2°): | −8.0 to 2.0 | −6.0 to 1.0 |
| $b^*_t$ (Ill. C. 2°): | −5.0 to 5.0 | −4.0 to 4.0 |
| L* (Ill. C. 2°): | <=77 | <=73 |
| $R_fY$ (Ill. C., 2 deg.): | 10 to 30% | 12 to 26% |
| $a^*_f$ (Ill. C., 2°): | 0 to 10.0 | 2.0 to 8.0 |
| $b^*_f$ (Ill. C., 2°): | −18.0 to 0.0 | −15.0 to −3.0 |
| L* (Ill. C. 2°): | 37-62 | 41-58 |
| $R_gY$ (Ill. C., 2 deg.): | 26 to 44% | 32 to 38% |
| $a^*_g$ (Ill. C., 2°): | −15.0 to −5.0 | −12.0 to −7.0 |
| $b^*_g$ (Ill. C., 2°): | −6.0 to 3.0 | −3.0 to 2.0 |
| L* (Ill. C. 2°): | 58-73 | 63-68 |

In certain example embodiments, it may be possible to reduce glass-side reflectance with a coating containing an absorber layer. The glass side color of the coated article and/or IG unit may be a more "intense" green. The solar factor (g value) of a green-tinted coated article and/or IG unit may also be reduced as compared to a layer stack having the same Ag-inclusive layer (layer 7) thickness but no color and/or reflectivity-adjusting absorber layer (layers 4 and/or 10).

A green-tinted coated article made according to the above embodiments may have a glass side reflectance Y of from about 26 to 42%, more preferably from about 28-40%, and most preferably from about 30 to 36% in certain example embodiments, when measured monolithically. In certain example embodiments, a green-tinted coated article (IG unit) may have an outside glass reflectance of about 26 to 44%, more preferably from about 30-40%, and most preferably frdm about 32-38%.

In certain example embodiments, a green-colored coated article (monolithically) may have an $a^*_g$ value of from about −15 to −5, more preferably from about −13 to −6, and most preferably from about −12 to −7. In certain example embodiments, a green-tinted coated article (monolithically) may have a $b^*_g$ value of from about −6 to 3, more preferably from about −4 to 2, and most preferably from about −3 to 1. An IG unit according to this embodiment may have an $a^*_g$ value of from about −15 to −5, more preferably from about −13 to −6, and most preferably from about −12 to −7. In certain example embodiments, a green-tinted coated article (IG unit) may have a $b^*_g$ value of from about −6 to 3, more preferably from about −4 to 2, and most preferably from about −3 to 2

In certain example embodiments, a green-tinted coated article (IG unit) may have a $L^*_g$ value of from about 58 to 73, more preferably from about 60 to 70, and most preferably from about 63 to 68.

The sheet resistance may be no greater than about 6.0 ohms/square, more preferably no greater than about 5.0 ohms/square, and most preferably no greater than about 4.0 ohms/square. The sheet resistance may be even lower in certain embodiments. The emissivity may be no greater than about 0.06, more preferably no greater than about 0.05, and most preferably no greater than about 0.04.

The visible transmission for a green-tinted coated article, particularly for an IG unit, may be from about 30-45% in certain example embodiments. The Solar Factor may be from about 26 to 32 for an IG unit according to certain example embodiments. Thus, the selectivity for a green-tinted coated article may be at least about 1.2, more preferably at least about 1.3, even more preferably 1.35, and most preferably at least about 1.40 or 1.43.

Example embodiments with neutral color (e.g. glass side reflective color) are described above with respect to FIGS. 1-5. This section is in addition to the above with respect to neutral-colored embodiments. An IG unit comprising a neutral-tinted coated article may have a visible transmission of from about 10 to 55%, more preferably from about 20 to 50%, and most preferably, from about 30 to 48%. When the desired tint of a coated article and/or IG unit is neutral, layers 4 and/or 10 may comprise or consist essentially of Ni and/or Cr. However, a nitride and/or oxynitride of nickel chromium may be used for layers 4 and/or 10 as well. Layers 4 and/or 10 may also comprise or consist essentially of an oxide, nitride, or oxynitride of Zb, Zr, and/or ZbZr. In a neutral-tinted coated article and/or IG unit, in certain example embodiments, layer 10 may not be present. In different example embodiments, layer 10 may be present while layer 4 is not. In other embodiments, however, layers 4 and/or 10 may both be included in the coating. Layers 4 and/or 10 may be fully or partially nitrided and/or oxided.

Layers 4 and/or 10 in certain embodiments of a neutral-tinted coated article and/or IG unit may be from about 10 to 150 Å, more preferably from about 15 to 75 Å, and most preferably from about 20 to 50 Å. In other embodiments, layer(s) 4 and/or 10 may be from about 10 to 40 Å in thickness.

In a neutral-tinted coated article and/or IG unit, dielectric layers 3 and/or 5 may comprise silicon nitride and/or silicon oxynitride in certain embodiments. Layer 3 may be from about 70 to 1200 Å, more preferably from about 75 to 200 Å, and most preferably from about 80 to 120 Å. In other embodiments, layer 3 may be from about 180 to 300 Å. In certain example embodiments of a neutral-tinted coated article and/or IG unit, layer 5 may be from about 20 to 1200 Å, more preferably from about 25 to 75 Å, and most preferably from about 40 to 60 Å. In other embodiments, layer 5 may be from about 100 to 280 Å.

Layers 6 and/or 8 in certain example embodiments of a neutral-tinted coated article and/or IG unit may comprise nickel chromium, and/or an oxide, nitride, and/or oxynitride of nickel chromium. In some embodiments, layers 6 and 8 may be of a similar thickness. However, the invention is not so limited. An example thickness for layers 6 and 8 is from about 1 to 150 Å, more preferably from about 5 to 50 Å, and most preferably from about 10 to 30 Å. In other example embodiments, layers 6 and/or 8 may be from about 10 to 50 Å in thickness.

Layer 7 may comprise silver and/or gold in certain example embodiments. The thickness of layer 7 may be from about 100 to 250 Å, more preferably from about 110 to 220 Å, and most preferably from 160 to 200 Å. This thicker silver-inclusive layer 7 may advantageously reduce IR radiation, and may reduce visible transmission if so desired. In other example embodiments, layer 7 may be from about 115 to 155 Å in thickness.

Layers 9, 10, and/or 11 are optional in certain embodiments. In certain example embodiments, there may only be one of layers 9 and 11, and layer 10 may not be included. Other embodiments may have all three of layers 9, 10, and 11. In different embodiments, layers 9, 10 and/or 11 may be present, and layers 3, 4 and/or 5 may not be.

When layers 10 and 11 are not included, in certain embodiments, layer 9 may be from about 70 to 1200 Å, more preferably from about 100 to about 900 Å, and most preferably, from about 300 to 700 Å. When layers 10 and 11 are included, layers 9 and/or 11 may be from about 70 to 1200 Å. In certain example embodiments of a neutral-tinted coated article and/or IG unit, layers 10 and 11 may not be included in the coating. In other embodiments, layers 9, 10 and/or 11 may be present, and layers 3, 4 and/or 5 (particularly layers 4 and/or 5) may not be present.

Layer 12 may be provided over the outermost layer in certain example embodiments. Layer 12 may enhance mechanical and/or durability of a coated article made according to example embodiments. Layer 12 may comprise an oxide, nitride, or oxynitride of zirconium or aluminum. Layer 12 may be partially and/or fully oxided and/or nitrided. In certain example embodiments, layer 12 may be from about 10 to 80 Å thick, more preferable, from about 20 to 70 Å, and most preferably, from about 30 to 50 Å in thickness. In other embodiments, layer 12 may be from about 10 to 60 Angstroms in thickness.

In certain example embodiments, a neutral-tinted coated article and/or IG unit containing at least one color and/or reflectivity-adjusting absorber layer may have a reduced transmission, which is desirable in certain applications, and reduced glass side reflectance, and/or increased IR ray blockage. In certain example embodiments, a reduced visible transmission may be desirable. The reflected glass side color may also be improved.

Example materials and thickness for layers for FIG. 3(a) embodiments such as neutral-colored embodiments are set forth below in Table 9.

TABLE 9

Example Materials/Thicknesses; FIG. 3(a) Embodiment

| Layer<br>Glass (1-10 mm thick) | More Preferred<br>Range (Å) | Most Preferred<br>(Å) | Example<br>(Å) |
|---|---|---|---|
| $Si_xN_y$ (layer 3) | 70-1200 Å | 180-300 Å | 240 Å |
| $NiCrN_x$ (layer 4) | 10-150 Å | 10-30 Å | 10 Å |
| $Si_xN_y$ (layer 5) | 70-1200 Å | 100-280 Å | 190 Å |
| NiCr (layer 6) | 10-150 Å | 10-50 Å | 25 Å |
| Ag (layer 7) | 100-170 Å | 115-155 Å | 150 Å |

TABLE 9-continued

Example Materials/Thicknesses; FIG. 3(a) Embodiment

| Layer<br>Glass (1-10 mm thick) | More Preferred<br>Range (Å) | Most Preferred<br>(Å) | Example<br>(Å) |
|---|---|---|---|
| NiCr (layer 8) | 10-150 Å | 10-50 Å | 25 Å |
| $Si_xN_y$ (layer 9) | 70 to 1200 Å | 300-700 Å | 580 Å |

In certain example embodiments of this invention, coated articles herein may have the following optical and solar characteristics set forth in Table 10 when measured monolithically (before or after any optional HT).

TABLE 10

Optical/Solar Characteristics for Neutral (Monolithic)

| Characteristic | General | More Preferred | Most Preferred |
|---|---|---|---|
| $R_s$ (ohms/sq.): | <=5.0 | <=4.0 | <=3.5 |
| $E_n$: | <=0.12 | <=0.05 | <=0.04 |
| $T_{vis}$ (Ill. C. 2°): | <=55% | <=50% | <=48% |

Moreover, in certain example laminated embodiments of this invention, coated articles herein which have been optionally heat treated to an extent sufficient for tempering, and which have been coupled to another glass substrate to form an IG unit, may have the following IG unit optical/solar characteristics.

TABLE 11

Example Optical Features for Neutral (Monolithic pre or post-HT)

| Characteristic | General | Most Preferred |
|---|---|---|
| $T_{vis}$ (or TY)(Ill. C. 2°): | <=55% | <=48% |
| $R_gY$ (Ill. C., 2 deg.): | 11 to 33% | 18 to 25% |
| $a^*_g$ (Ill. C., 2°): | −5.0 to 1.0 | −3.0 to 0.0 |
| $b^*_g$ (Ill. C., 2°): | −5.0 to 1.0 | −4.0 to 0.0 |
| $L^*$ (Ill. C. 2°): | 39-64 | 49-58 |

TABLE 12

Example Optical Features (IG Unit pre or post-HT)

| Characteristic | General | Most Preferred |
|---|---|---|
| $T_{vis}$ (or TY)(Ill. C. 2°): | <=50% | <=45% |
| $L^*$ (Ill. C. 2°): | <=77 | <=73 |
| $R_fY$ (Ill. C., 2 deg.): | 15 to 27% | 18 to 25% |
| $L^*$ (Ill. C. 2°): | 45-59 | 49-58 |
| $R_gY$ (Ill. C., 2 deg.): | 11 to 35% | 19 to 27% |
| $a^*_g$ (Ill. C., 2°): | −5.0 to 1.0 | −3.0 to 0.0 |
| $b^*_g$ (Ill. C., 2°): | −5.0 to 1.0 | −4.0 to 0.0 |
| $L^*_g$ (Ill. C. 2°): | 39-66 | 50-59 |

Monolithically, a neutral-tinted coated article may have a visible transmission of from about 40 to 48%.

A neutral-tinted coated article made according to the above embodiments may have a glass side reflectance Y of from about 11 to 33%, more preferably from about 15-28%, and most preferably from about 18 to 25% in certain example embodiments. These values are for a monolithic coated article. An IG unit with a neutral-tinted coated article may have an outside reflectance Y of from about 11 to 35%, more preferably from about 16 to 30%, and most preferably from about 19 to 27%.

In certain example embodiments, monolithically, a neutral-tinted coated article may have an $a^*_g$ value of from about −5 to 1, more preferably from about −4 to 1, and most preferably from about −3 to 0. In certain example embodiments, monolithically, a neutral-tinted coated article may have a $b^*_g$ value of from about −5 to 1, more preferably from about −4.5 to 1, and most preferably from about −4 to −0. In certain example embodiments, monolithically, a neutral-tinted coated article may have a $L^*_g$ value of from about 39 to 64, more preferably from about 45 to 62, and most preferably from about 49 to 58.

An IG unit with a neutral-tinted coated article may have an $a^*_g$ value of from about −5 to 1, more preferably from about −4 to 1, and most preferably from about −3 to 0. The neutral-tinted IG unit may have a $b^*_g$ value of from about −5 to 1, more preferably from about −4.5 to 1, and most preferably from about −4 to 0.

The sheet resistance of a neutral-tinted coated article may be no greater than about 5.0 ohms/square, more preferably no greater than about 4.0 ohms/square, and most preferably no greater than about 3.5 ohms/square. The visible transmission of a neutral-tinted IG unit is preferably from about 30 to 45%, and the Solar Factor is from about 28 to 32. Therefore, selectivity is preferably at least (or greater than) about 1.2, more preferably at least (or greater than) about 1.3, and most preferably at least (or greater than)about 1.40 or about 1.43.

The emissivity of a neutral tinted coated article may be no greater than or equal to about 0.06, more preferably no greater than or equal to 0.05, and most preferably no greater than or equal to 0.04.

Example embodiments with blue color (e.g., glass side reflective color) are described above—see FIGS. 1-5. This section is in addition to the foregoing with respect to blue-colored embodiments. A coated article comprising a blue-tinted coated article may have a visible transmission of from about 10 to 55%, more preferably from about 20 to 50%, and most preferably, from about 30 to 48%. When the desired tint of a coated article and/or IG unit is blue, layers 4 and/or 10 may comprise or consist essentially of Ni and/or Cr. However, a nitride and/or oxynitride of nickel chromium may be used for layers 4 and/or 10 as well. An oxide and/or oxynitride of Nb, Zr, and.or NbZr may also be used in certain example embodiments for absorber layers 4 and/or 10. In a blue-tinted coated article and/or IG unit, in certain example embodiments, layer 10 may not be present. In different example embodiments, layer 10 may be present while layer 4 is not. In other embodiments, however, layers 4 and/or 10 may both be included in the coating. Layers 4 and/or 10 may be fully or partially nitrided and/or oxided.

Layers 4 and/or 10 in certain embodiments of a blue-tinted coated article and/or IG unit may be from about 10 to 150 Å, more preferably from about 10 to 50 Å, and most preferably from about 10 to 40 Å. Layers 4 and/or 10 may be even thinner in certain example embodiments.

In a blue-tinted coated article and/or IG unit, dielectric layers 3 and/or 5 may comprise silicon nitride and/or silicon oxynitride in certain embodiments. Layer 3 may be from about 70 to 1200 Å, more preferably from about 100 to 400 Å, and most preferably from about 150 to 350 Å. In certain example embodiments of a blue-tinted coated article and/or IG unit, layer 5 may be from about 20 to 1200 Å, more preferably from about 200 to 1200 Å, and most preferably from about 500 to 900 Å.

Layers 6 and/or 8 in certain example embodiments of a blue-tinted coated article and/or IG unit may comprise nickel chromium, and/or an oxide, nitride, and/or oxynitride of nickel chromium. In some embodiments, layers 6 and 8 may be of a similar thickness. However, the invention is not so limited. An example thickness for layers 6 and 8 is from about 10 to 150 Å, more preferably from about 10 to 50 Å, and most preferably from about 10 to 40 Å. Layers 6 and/or 8 may be even thinner than 10 Å in some embodiments.

Layer 7 may comprise silver and/or gold in certain example embodiments. The thickness of layer 7 may be from about 100 to 170 Å, more preferably from about 110 to 160 Å, and most preferably from 120 to 140 Å.

Layers 9, 10, and/or 11 are optional in certain embodiments. In certain example embodiments, there may only be one of layers 9 and 11, and layer 10 may not be included. Other embodiments may have all three of layers 9, 10, and 11. In different embodiments, layers 9, 10 and/or 11 may be present, and layers 3, 4 and/or 5 may not be.

When layers 10 and 11 are not included, in certain embodiments, layer 9 may be from about 70 to 1200 Å, more preferably from about 100 to about 900 Å, and most preferably, from about 300 to 700 Å. When layers 10 and 11 are included, layers 9 and/or 11 may be from about 70 to 1200 Å. In certain example embodiments of a blue-tinted coated article and/or IG unit, layers 10 and 11 may not be included in the coating. In other embodiments, layers 9, 10 and/or 11 may be present, and layers 3, 4 and/or 5 (particularly layers 4 and/or 5) may not be present.

Layer 12 may be provided over the outermost layer in certain example embodiments. Layer 12 may enhance mechanical and/or durability of a coated article made according to example embodiments. Layer 12 may comprise an oxide, nitride, or oxynitride of zirconium or aluminum. Layer 12 may be partially and/or fully oxided or nitrided. In certain example embodiments, layer 12 may be from about 10 to 80 Å thick, more preferably, from about 20 to 70 Å, and most preferably, from about 30 to 50 Å in thickness.

In certain example embodiments, a blue-tinted coated article and/or IG unit containing at least one color and/or reflectivity-adjusting absorber layer may have a reduced transmission, which is desirable in certain applications, and reduced glass side reflectance. The reflected glass side color may also be improved.

By adjusting the thickness of layers 3-12, the glass side reflectance and color of certain example embodiments of this invention may be optimized. Visible transmission, in certain embodiments, may be desirably reduced. In these or other embodiments, the solar factor and/or reflectivity may also be improved.

Example materials and thicknesses for layers for FIG. 3(a) embodiments such as blue colored embodiments are set forth below in Table 13

TABLE 13

Example Materials/Thicknesses; FIG. 3(a) Embodiment

| Layer<br>Glass (1-10 mm thick) | More Preferred<br>Range (Å) | Most Preferred<br>(Å) | Example<br>(Å) |
|---|---|---|---|
| $Si_xN_y$ (layer 3) | 70-1200 Å | 150-350 Å | 270 Å |
| $NiCrN_x$ (layer 4) | 10-150 Å | 10-40 Å | 12 Å |
| $Si_xN_y$ (layer 5) | 70-1200 Å | 500-900 Å | 700 Å |
| NiCr (layer 6) | 10-150 Å | 10-40 Å | 25 Å |
| Ag (layer 7) | 100-170 Å | 120-140 Å | 130 Å |
| NiCr (layer 8) | 10-150 Å | 10-40 Å | 25 Å |
| $Si_xN_y$ (layer 9) | 70 to 1200 Å | 300-700 Å | 430 Å |

In certain example embodiments of this invention, coated articles herein may have the following optical and solar characteristics set forth in Table 10 when measured monolithically (before or after any optional HT).

TABLE 14

Optical/Solar Characteristics for Blue (Monolithic)

| Characteristic | General | More Preferred | Most Preferred |
|---|---|---|---|
| $R_s$ (ohms/sq.): | <=6.0 | <=5.0 | <=4.0 |
| $E_n$: | <=0.06 | <=0.05 | <=0.04 |
| $T_{vis}$ (Ill. C. 2°): | <=55% | <=50% | <=48% |

Moreover, in certain example laminated embodiments of this invention, coated articles herein which have been optionally heat treated to an extent sufficient for tempering, and which have been coupled to another glass substrate to form an IG unit, may have the following IG unit optical/solar characteristics.

TABLE 15

Example Optical Features for Blue (Monolithic pre or post-HT)

| Characteristic | General | Most Preferred |
|---|---|---|
| $T_{vis}$ (or TY)(Ill. C. 2°): | <=55% | <=48% |
| $R_gY$ (Ill. C., 2 deg.): | 15 to 30% | 20 to 27% |
| $a^*_g$ (Ill. C., 2°): | −4.0 to 2.0 | −3.0 to 1.0 |
| $b^*_g$ (Ill. C., 2°): | −22.0 to −10.0 | −19.0 to −15.0 |
| $L^*$ (Ill. C. 2°): | 45-62 | 51-59 |

TABLE 16

Example Optical Features (IG Unit pre or post-HT)

| Characteristic | General | Most Preferred |
|---|---|---|
| $T_{vis}$ (or TY)(Ill. C. 2°): | <=50% | <=45% |
| $L^*$ (Ill. C. 2°): | <=77 | <=73 |
| $R_fY$ (Ill. C., 2 deg.): | 15 to 30% | 18 to 28% |
| $L^*$ (Ill. C. 2°): | 45-62 | 49-60 |
| $R_gY$ (Ill. C., 2 deg.): | 17 to 32% | 21 to 28% |
| $a^*_g$ (Ill. C., 2°): | −5.0 to 2.0 | −3.5 to 1.0 |
| $b^*_g$ (Ill. C., 2°): | −22.0 to −10.0 | −19 to −15.0 |
| $L^*_g$ (Ill. C. 2°): | 48-64 | 52-60 |

A blue-tinted coated article made according to the above embodiments (monolithically) may have a glass side reflectance Y of from about 15 to 30%, more preferably from about 17-29%, and most preferably from about 20 to 27% in certain example embodiments. A blue-tinted IG unit may have an outside reflectance Y of about 17 to 32%, more preferably from about 19 to 30%, and most preferably from about 21 to 28%.

In certain example embodiments, a blue-tinted coated article (monolithically) may have an $a^*_g$ value of from about −4 to 2, more preferably from about −3.5 to 1.5, and most preferably from about −3 to 1. In certain example embodiments, a blue-tinted coated article may (monolithically) have a $b^*_g$ value of from about −22 to −10, more preferably from about −21 to −12, and most preferably from about −19 to −15. In certain example embodiments, a blue-tinted coated article may (monolithically) have a $L^*_g$ value of from about 45 to 62, more preferably from about 48 to 60, and most preferably from about 51 to 59. A blue-tinted IG unit may have a $L^*_g$ value of from about 48 to 64, more preferably from about 50 to 62, and most preferably from about 52 to 60

In certain example embodiments, a blue-tinted coated article (IG unit) may have an $a^*_g$ value of from about −5 to 2, more preferably from about −4 to −1.5, and most preferably from about −3.5 to −1.0. In certain example embodiments, a blue-tinted coated article (IG unit) may have a $b^*_g$ value of from about −22 to −10, more preferably from about −21 to −12, and most preferably from about −19 to −15.

The sheet resistance of a blue-tinted coated article according to certain example embodiments may be less than about 6.0 ohms/square, more preferably less than about 5.0 ohms/square, and most preferably less than about 4.0 ohms/square. The emissivity may be less than about 0.06, more preferably less than about 0.05, and most preferably less than about 0.04.

The visible transmission of an IG unit made according to one of these example embodiments may preferably be from about 30-45%, and even more preferably from about 35-43%. The Solar Factor may be from about 29 to 33, and thus the selectivity is at least about 1.2, more preferably at least about 1.30, and most preferably about 1.40.

It is noted that the tables in the instant specification represent certain example embodiments, and the invention is not so limited.

Any and/or all of the silicon-based layers discussed herein may be doped with other materials such as stainless steel or aluminum in certain example embodiments of this invention. For example, any and/or all silicon-based layers discussed herein may optionally include from about 0-15% aluminum, more preferably from about 1 to 10% aluminum, in certain example embodiments of this invention. The silicon-based layer(s) may be deposited by sputtering a target of Si or SiAl in certain embodiments of this invention. Oxygen may also be provided in certain instances in the silicon nitride layers.

The foregoing descriptions of layer composition and thickness are not limited to embodiments of a specific color.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

EXAMPLES AND COMPARATIVE EXAMPLES

Examples 1-5

Bronze

A simulation of a bronze-tinted coated article was performed. The sputtering of a low-E coating 30 as described in certain example embodiments of this invention onto a 6 mm clear glass substrate was simulated. The simulated stack for a bronze-tinted coated article had layers with the approximate thicknesses as listed below:

TABLE 17

| Example 1 Layer Thicknesses | |
|---|---|
| Layer | Example 1 (Å) |
| Glass (1-10 mm thick) | 6 mm clear glass |
| $Si_3N_4$ (layer 3) | 140 Å |
| $NiCrN_x$ (layer 4) | 50 Å |
| $Si_3N_4$ (layer 5) | 320 Å |
| $NiCrN_x$ (layer 6) | 30 Å |
| Ag (layer 7) | 130 Å |

TABLE 17-continued

| Example 1 Layer Thicknesses | |
|---|---|
| Layer | Example 1 (Å) |
| $NiCrN_x$ (layer 8) | 30 Å |
| $Si_3N_4$ (layer 9) | 480 Å |

The following table contains a comparison of properties (simulated) of the Example 1 bronze-tinted coated article using the absorber layer and a coated article without an absorber layer as a comparative example.

TABLE 18

| Comparative Example and Example 1 | | |
|---|---|---|
| Characteristic | No Absorber Layer | Ex. 1-Absorber Layer |
| $T_{vis}$ (mono) (or TY)(Ill. C. 2°): | 42.9% | 42.6% |
| $a^*_t$ (Ill. C. 2°): | −5.0 | −4.5 |
| $b^*_t$ (Ill. C. 2°): | −10.0 | 1.4 |
| $L^*$ (Ill. C. 2°): | 71.5 | 71.3 |
| $R_fY$ (Ill. C., 2 deg.): | 12.5% | 12.2% |
| $a^*_f$ (Ill. C., 2°): | 16.0 | 12.4 |
| $b^*_f$ (Ill. C., 2°): | 23.0 | −19.5 |
| $L^*$ (Ill. C. 2°): | 42.0 | 41.6 |
| $R_gY$ (Ill. C., 2 deg.): | 23.9% | 9.6% |
| $a^*_g$ (Ill. C., 2°): | 4.5 | 1.2 |
| $b^*_g$ (Ill. C., 2°): | 5.0 | 2.8 |
| $L^*$ (Ill. C. 2°): | 56.0 | 37.1 |
| Solar Factor (IGU) | 28 | 28 |
| $E_n$: | 0.03 | 0.03 |

As can be seen above, through the inclusion of an absorber layer between dielectric layers 3 and/or 5, the glass side reflectance of a coated article can be reduced. The layer stack simulated according to example embodiments of this invention shows that a 50% reduction in glass side reflectance is possible, as well as less reddish color on the glass side. The film side color is also improved. Moreover, the visible transmission is substantially unaffected, and the emissivity of 0.03 is good. In the simulation, the low-E coating was applied to a substantially clear glass substrate. The $a^*_g$ value of 1.2 and a $b^*_g$ value of 2.8 will cause the coated article to appear bronze-colored (but less reddish) when viewed from the glass side/outside. There will be less glass side/outside reflection, which is advantageous from architectural and aesthetic standpoints.

Test results for a bronze-tinted coated article with an absorber layer are as follows:

TABLE 19

| Bronze Monolithic Example Properties | | | | |
|---|---|---|---|---|
| Characteristic | Ex. 2 | Ex. 3 | Ex. 4 | Ex. 5 |
| $T_{vis}$ (or TY)(Ill. C. 2°): | 43.7% | 44.5% | 44.1% | 46.9% |
| $a^*_t$ (Ill. C. 2°): | −4.1 | −4.8 | −5.1 | −6.0 |
| $b^*_t$ (Ill. C. 2°): | 3.7 | 2.7 | 2.6 | −0.2 |
| $L^*$ (Ill. C. 2°): | 72.0 | 72.6 | 73.2 | 74.1 |
| $R_fY$ (Ill. C., 2 deg.): | 16.1% | 15.2% | | |
| $a^*_f$ (Ill. C., 2°): | 10.2 | 13.8 | | |
| $b^*_f$ (Ill. C., 2°): | −15.6 | −13.5 | | |
| $L^*$ (Ill. C. 2°): | 47.1 | 45.9 | | |
| $R_gY$ (Ill. C., 2 deg.): | 11.9% | 11.9% | 11.3% | 12.3% |
| $a^*_g$ (Ill. C., 2°): | 2.1 | 2.1 | 3.1 | 4.1 |
| $b^*_g$ (Ill. C., 2°): | 1.9 | 2.3 | 1.2 | 1.2 |
| $L^*$ (Ill. C. 2°): | 41.1 | 41.1 | 40.1 | 41.7 |
| Sheet Resistance (Ohms/sq) | 3.6 | 3.6 | 3.6 | 3.0 |

Examples 2 and 3 were incorporated into an IG unit for further testing:

TABLE 20

Bronze IG Unit Example Properties

| Characteristic | Ex. 2 | Ex. 3 |
|---|---|---|
| $T_{vis}$ (or TY)(Ill. C. 2°): | 39.8% | 40.5% |
| $a^*_t$ (Ill. C. 2°): | −4.5 | −5.2 |
| $b^*_t$ (Ill. C. 2°): | 3.5 | 2.5 |
| $L^*$ (Ill. C. 2°): | 69.3 | 69.8 |
| $R_f Y$ (Ill. C., 2 deg.): | 21.5% | 20.7% |
| $a^*_f$ (Ill. C., 2°): | 6.1 | 8.4 |
| $b^*_f$ (Ill. C., 2°): | −11.4 | −9.8 |
| $L^*$ (Ill. C. 2°): | 53.5 | 52.6 |
| $R_g Y$ (Ill. C., 2 deg.): | 13.5% | 13.6% |
| $a^*_g$ (Ill. C., 2°): | 1.2 | 1.1 |
| $b^*_g$ (Ill. C., 2°): | 2.2 | 2.4 |
| $L^*$ (Ill. C. 2°): | 43.5 | 43.7 |
| Solar Factor | 28.3 | 28.8 |

Examples 6-10

Green

A simulation of a green-tinted coated article was performed. The sputtering of a low-E coating 30 onto a 6 mm clear glass substrate was simulated. The simulated stack for a green-tinted coated article included layers with the approximate thicknesses as listed below:

TABLE 21

Example 6 Layer Thicknesses

| Layer | Example 6 (Å) |
|---|---|
| Glass (1-10 mm thick) | 6 mm clear glass |
| $Si_3N_4$ (layer 3) | 280 Å |
| $NiCrN_x$ (layer 4) | 50 Å |
| $Si_3N_4$ (layer 5) | 1020 Å |
| $NiCrN_x$ (layer 6) | 40 Å |
| Ag (layer 7) | 130 Å |
| $NiCrN_x$ (layer 8) | 40 Å |
| $Si_3N_4$ (layer 9) | 510 Å |

The following table contains a comparison of properties (simulated) of a green-tinted coated article using the absorber layer and a coated article without an absorber layer.

TABLE 22

| Characteristic | No Absorber Layer | Ex. 6-Absorber Layer |
|---|---|---|
| $T_{vis}$ (mono) (or TY)(Ill. C. 2°): | 44.0% | 43.8% |
| $a^*_t$ (Ill. C. 2°): | 1.1 | −3.8 |
| $b^*_t$ (Ill. C. 2°): | 1.2 | 2.6 |
| $L^*$ (Ill. C. 2°): | 72.2 | 72.1 |
| $R_f Y$ (Ill. C., 2 deg.): | 20.1% | 11.0% |
| $a^*_f$ (Ill. C., 2°): | 16.0 | 12.4 |
| $b^*_f$ (Ill. C., 2°): | 23.0 | −19.5 |
| $L^*$ (Ill. C. 2°): | 52.0 | 39.6 |
| $R_g Y$ (Ill. C., 2 deg.): | 38.5% | 32.3% |
| $a^*_g$ (Ill. C., 2°): | −8.0 | −12.0 |
| $b^*_g$ (Ill. C., 2°): | −1.0 | −1.0 |
| $L^*$ (Ill. C. 2°): | 68.4 | 63.6 |
| Solar Factor (IGU) | 34 | 30 |
| $E_n$: | 0.03 | 0.03 |

As can be seen above, through the inclusion of a color and/or reflectivity-adjusting absorber layer, the glass side reflectance of a coated article can be reduced. Moreover, the visible transmission is substantially unaffected, and the emissivity of 0.03 is good.

Certain example embodiments as described herein of green-tinted coated articles were produced. They were coated with a zirconium oxide-based overcoat to increase mechanical durability.

The results were as follows:

TABLE 23

Green Monolithic Example Properties

| Characteristic | Ex. 7 | Ex. 8 | Ex. 9 | Ex. 10 |
|---|---|---|---|---|
| $T_{vis}$ (or TY)(Ill. C. 2°): | 41.2% | 44.1% | 44.2% | 43.4% |
| $a^*_t$ (Ill. C. 2°): | −3.8 | −4.6 | −2.9 | −3.4 |
| $b^*_t$ (Ill. C. 2°): | −0.2 | −2.4 | −1.4 | −3.7 |
| $L^*$ (Ill. C. 2°): | 70.3 | 72.3 | 70.3 | 71.8 |
| $R_f Y$ (Ill. C., 2 deg.): | 16.6% | 20.5% | 17.3% | 21.9% |
| $a^*_f$ (Ill. C., 2°): | 8.3 | 6.7 | 6.8 | 4.3 |
| $b^*_f$ (Ill. C., 2°): | −14.1 | −8.4 | −12.4 | −6.2 |
| $L^*$ (Ill. C. 2°): | 47.8 | 52.4 | 48.6 | 53.9 |
| $R_g Y$ (Ill. C., 2 deg.): | 34.6% | 35.3% | 34.0% | 35.0% |
| $a^*_g$ (Ill. C., 2°): | −10.1 | −8.4 | −9.5 | −8.4 |
| $b^*_g$ (Ill. C., 2°): | 1.4 | 0.8 | −1.4 | −2.0 |
| $L^*$ (Ill. C. 2°): | 65.4 | 66.0 | 65.0 | 65.7 |
| Sheet Resistance (Ohms/sq) | 4.0 | 3.1 | 4.1 | 3.5 |

Examples 7 and 8 were incorporated into an IG unit for further testing:

TABLE 24

Green IG Unit Example Properties

| Characteristic | Ex. 7 | Ex. 8 |
|---|---|---|
| $T_{vis}$ (or TY)(Ill. C. 2°): | 38.3% | 41.2% |
| $a^*_t$ (Ill. C. 2°): | −4.1 | −5.0 |
| $b^*_t$ (Ill. C. 2°): | −0.3 | −2.2 |
| $L^*$ (Ill. C. 2°): | 68.2 | 70.3 |
| $R_f Y$ (Ill. C., 2 deg.): | 22.4% | 25.9% |
| $a^*_f$ (Ill. C., 2°): | 4.8 | 3.9 |
| $b^*_f$ (Ill. C., 2°): | −10.9 | −6.9 |
| $L^*$ (Ill. C. 2°): | 54.4 | 57.9 |
| $R_g Y$ (Ill. C., 2 deg.): | 36.7% | 37.7% |
| $a^*_g$ (Ill. C., 2°): | −10.5 | −9.1 |
| $b^*_g$ (Ill. C., 2°): | 1.1 | 0.5 |
| $L^*$ (Ill. C. 2°): | 67.1 | 67.9 |
| Solar Factor | 27.7 | 28.7 |

Visible transmission, sheet resistance, and emissivity were all good.

Example 11

Neutral

A neutral-tinted coated article was produced. The following stack was sputtered onto a 6 mm clear class substrate. The neutral-tinted coated article included layers with the approximate thicknesses as listed below:

TABLE 25

Example 11 Layer Thicknesses

| Layer | Example 11 (Å) |
|---|---|
| Glass (1-10 mm thick) | 6 mm clear glass |
| $Si_3N_4$ (layer 3) | 240 Å |
| $NiCrN_x$ (layer 4) | 10 Å |
| $Si_3N_4$ (layer 5) | 190 Å |

TABLE 25-continued

Example 11 Layer Thicknesses

| Layer | Example 11 (Å) |
|---|---|
| NiCrN$_x$ (layer 6) | 25 Å |
| Ag (layer 7) | 150 Å |
| NiCrN$_x$ (layer 8) | 25 Å |
| Si$_3$N$_4$ (layer 9) | 580 Å |

Example stacks 12 and 13 were made based on layer 11 and other embodiments disclosed herein. The results were as follows:

TABLE 26

Neutral Monolithic Example Properties

| Characteristic | Ex. 12 | Ex. 13 |
|---|---|---|
| T$_{vis}$ (or TY)(Ill. C. 2°): | 43.2% | 43.9% |
| a*$_t$ (Ill. C. 2°): | −3.5 | −3.7 |
| b*$_t$ (Ill. C. 2°): | 9.7 | 7.1 |
| L* (Ill. C. 2°): | 71.7 | 72.2 |
| R$_f$Y (Ill. C., 2 deg.): | 20.3% | 22.7% |
| a*$_f$(Ill. C., 2°): | 4.5 | 4.4 |
| b*$_f$(Ill. C., 2°): | 24.9 | 23.1 |
| L* (Ill. C. 2°): | 52.2 | 54.8 |
| R$_g$Y (Ill. C., 2 deg.): | 21.3% | 22.0% |
| a*$_g$ (Ill. C., 2°): | 0.1 | 0.6 |
| b*$_g$ (Ill. C., 2°): | −3.0 | −3.6 |
| L* (Ill. C. 2°): | 53.3 | 54.0 |
| Sheet Resistance (Ohms/sq) | 3.6 | 3.2 |

Examples 12 and 13 were incorporated into an IG unit for further testing:

TABLE 27

Neutral IG Unit Example Properties

| Characteristic | Ex. 12 | Ex. 13 |
|---|---|---|
| T$_{vis}$ (or TY)(Ill. C. 2°): | 40.0% | 40.6% |
| a*$_t$ (Ill. C. 2°): | −3.3 | −3.6 |
| b*$_t$ (Ill. C. 2°): | 8.6 | 6.3 |
| L* (Ill. C. 2°): | 69.5 | 69.9 |
| R$_f$Y (Ill. C., 2 deg.): | 25.8% | 27.8% |
| a*$_f$(Ill. C., 2°): | 1.7 | 1.8 |
| b*$_f$(Ill. C., 2°): | −19.9 | −18.8 |
| L* (Ill. C. 2°): | 57.8 | 59.7 |
| R$_g$Y (Ill. C., 2 deg.): | 23.2% | 24.2% |
| a*$_g$ (Ill. C., 2°): | −0.3 | 0.0 |
| b*$_g$ (Ill. C., 2°): | −2.1 | −2.9 |
| L* (Ill. C. 2°): | 55.3 | 56.3 |
| Solar Factor | 29.1 | 29.2 |

Examples 14-16 and Comparative Examples

Neutral

A neutral-tinted coated article was made with the following stacks—the thicknesses are in nanometers (nm):

TABLE 28

| Layer Material | Comparative Example A | Comparative Example B | Ex. 14 | Ex. 15 | Ex. 16 |
|---|---|---|---|---|---|
| SiN$_x$ | 65.0 | 39.7 | 39.7 | 38.3 | 37.5 |
| NiCr | 5.0 | 3.8 | 3.8 | 1.5 | 1.5 |
| Ag | 12.0 | 6.9 | 12.0 | 12.0 | 12.0 |
| NiCr | 2.5 | 4.9 | 3.5 | 2.0 | 2.0 |
| SiN$_x$ | 14.0 | 21.9 | 10.0 | 11.9 | 19.6 |
| NiCr | | | 1.0 | 3.4 | 2.8 |
| SiN$_x$ | | | 20.0 | 13.8 | 8.0 |
| 6 mm glass | | | | | |

In Example 14, the bottom SiN$_x$ layer was split, and a thin metallic NiCr-based layer was introduced as the color and/or reflectivity-adjusting absorber layer. The main function of the NiCr-inclusive layer is to reduce transmission and reflectance. Putting this layer between two SiN$_x$ layers reduces changes in the layer upon heat treatment.

In Example 15, a NiCr-based layer was also put between two SiN$_x$ layers to reduce visible transmission and glass side/outside reflectance. Making the NiCr layer thicker (e.g., 3.4 nm instead of 1.0 nm, or 34 Å instead of 10) improves the R$_{out}$ reflected color from a positive a* (red) and slight negative b* (light blue) to a negative a* (green) and a noticeable negative b* (blue). However, the thickness of the NiCr-based layers surrounding the silver layer must be reduced in this embodiment.

In Example 16, the NiCr-based layer is reduced from Example 15, and the thickness of the second silicon nitride layer was increased. Though the g-value may be increased, this stack has good visible transmission and glass side reflectance values.

Example 17

Neutral

Another example neutral-tinted coating is the following stack, with the thicknesses in nanometers:

| | |
|---|---|
| ZrO$_x$ | 4.5 nm |
| Si$_3$N$_x$ | 46.1 nm |
| NiCr | 2.0 nm |
| Ag | 18 nm |
| NiCr | 2.0 nm |
| Si$_3$N$_x$ | 5.0 nm |
| NbZrN$_x$ | 3.4 nm |
| Si$_3$N$_x$ | 9.9 nm |
| Glass substrate | |

NbZrN$_x$ has a refractive index of approximately 2.81 at 550 nm, and k is approximately 2.12. The g-value (Solar Factor) of this stack is approximately 3% better than one without an absorber layer, and this stack permits the same visible transmission. Thus, selectivity is increased. T$_{vis}$ is between 41.5 and 44.5 for the monolithic coated glass sheet. The glass side reflectance is between 19 and 22%, and the a*$_g$ is between −0.5 and 1.0, and the b*$_g$ is between −4.0 and −1.0. The U-value of this stack is between 1.1 and 1.2. An optimal g-value (Solar Factor) for this stack is 0.28.

Example 18

Blue

A blue-tinted coated article was produced. The following stack was sputtered onto a 6 mm clear class substrate. The blue-tinted coated article had layers with the approximate thicknesses as listed below:

TABLE 29

Example 18 Layer Thicknesses

| Layer | Example 18 (Å) |
|---|---|
| Glass (1-10 mm thick) | 6 mm clear glass |
| $Si_3N_4$ (layer 3) | 270 Å |
| $NiCrN_x$ (layer 4) | 12 Å |
| $Si_3N_4$ (layer 5) | 700 Å |
| $NiCrN_x$ (layer 6) | 25 Å |
| Ag (layer 7) | 130 Å |
| $NiCrN_x$ (layer 8) | 25 Å |
| $Si_3N_4$ (layer 9) | 430 Å |

The samples were coated with a zirconium oxide overcoat to increase mechanical durability.

The blue-tinted stack including the absorber layer was simulated before the test, and compared to a layer stack not containing an absorber layer. Those results were as follows:

TABLE 30

Comparative Example and Ex. 18

| Characteristic | No Absorber Layer | Ex. 18-Absorber Layer |
|---|---|---|
| $T_{vis}$ (mono) (or TY)(Ill. C. 2°): | 40.7% | 41.2% |
| $a^*_t$ (Ill. C. 2°): | −3.0 | −3.9 |
| $b^*_t$ (Ill. C. 2°): | 1.0 | −1.7 |
| $L^*$ (Ill. C. 2°): | 70.0 | 70.3 |
| $R_fY$ (Ill. C., 2 deg.): | 10.7% | 13.8% |
| $a^*_f$ (Ill. C., 2°): | 15.0 | 16.0 |
| $b^*_f$ (Ill. C., 2°): | 14.0 | 0.5 |
| $L^*$ (Ill. C. 2°): | 39.0 | 43.9 |
| $R_gY$ (Ill. C., 2 deg.): | 22.0% | 21.4% |
| $a^*_g$ (Ill. C., 2°): | −0.8 | −0.8 |
| $b^*_g$ (Ill. C., 2°): | −16.5 | −16.5 |
| $L^*$ (Ill. C. 2°): | 54.0 | 53.4 |
| Solar Factor (IGU) | 31 | 29 |
| $E_n$: | 0.09 | 0.03 |

Example layer stacks 19 and 20 were made based on Example 18 and other embodiments disclosed herein. The results are as follows:

TABLE 31

Blue Monolithic Example Properties

| Characteristic | Ex. 19 | Ex. 20 |
|---|---|---|
| $T_{vis}$ (or TY)(Ill. C. 2°): | 42.8% | 44.6% |
| $a^*_t$ (Ill. C. 2°): | −3.4 | −4.4 |
| $b^*_t$ (Ill. C. 2°): | 3.0 | 0.9 |
| $L^*$ (Ill. C. 2°): | 71.4 | 72.6 |
| $R_fY$ (Ill. C., 2 deg.): | 19.1% | 24.2% |
| $a^*_f$ (Ill. C., 2°): | 10.1 | 8.3 |
| $b^*_f$ (Ill. C., 2°): | −9.5 | −6.8 |
| $L^*$ (Ill. C. 2°): | 50.8 | 56.3 |
| $R_gY$ (Ill. C., 2 deg.): | 24.1% | 25.3% |
| $a^*_g$ (Ill. C., 2°): | 0.5 | 1.2 |
| $b^*_g$ (Ill. C., 2°): | −17.4 | −15.2 |
| $L^*$ (Ill. C. 2°): | 56.2 | 57.4 |
| Sheet Resistance (Ohms/sq) | 4.0 | 3.6 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article comprising a coating supported by a glass substrate, the coating comprising moving away from the glass substrate:
    a first dielectric layer comprising silicon nitride;
    a first contact layer;
    an IR reflecting layer comprising silver, wherein the coating has only one IR reflecting layer comprising silver;
    a second contact layer, the first and second contact layers each directly contacting the IR reflecting layer;
    a second dielectric layer comprising silicon nitride; and
    wherein at least one of the first and second dielectric layers comprising silicon nitride is split by an absorber layer comprising NbZr, wherein the absorber layer at least in part causes and/or permits color tuning of the coated article; and
    wherein the coated article has a selectivity of at least about 1.2, a solar factor of no greater than about 32, and a glass side reflectance (Y) of the coated article is no greater than about 30%.

2. The coated article of claim 1, wherein the absorber layer is provided so that the coated article is green colored by way of an $a^*_g$ color value of from about −15.0 to −5.0 and a $b^*_g$ color value of from about −6.0 to 3.0, and is able to achieve such coloration when having only one IR reflecting layer comprising silver.

3. The coated article of claim 2, wherein the green colored coated article has an $a^*_g$ color value of from about −12.0 to −7.0 and a $b^*_g$ color value of from about −3.0 to 1.0.

4. The coated article of claim 2, wherein the glass substrate is substantially clear colored and the coating provides the green coloration to the coated article.

5. The coated article of claim 1, wherein the absorber layer is provided so that the coated article is neutral-colored by way of an $a^*_g$ color value of from about −5.0 to 1.0 and a $b^*_g$ color value of from about −5.0 to 1.0, and is able to achieve such coloration when having only one IR reflecting layer comprising silver.

6. The coated article of claim 5, wherein the neutral-colored coated article has an $a^*_g$ color value of from about −3.0 to 0 and a $b^*_g$ color value of from about −4.0 to 0.

7. The coated article of claim 5, wherein the glass substrate is substantially clear colored and the coating provides the neutral coloration to the coated article.

8. The coated article of claim 1, wherein the absorber layer is provided so that the coated article is blue-colored by way of an $a^*_g$ color value of from about −4.0 to 2.0 and a $b^*_g$ color value of from about −22.0 to −10.0, and is able to achieve such coloration when having only one IR reflecting layer comprising silver.

9. The coated article of claim 8, wherein the blue-colored coated article has an $a^*_g$ color value of from about −3.0 to 1.0 and a $b^*_g$ color value of from about −19.0 to −15.0.

10. The coated article of claim 1, wherein the coating further comprises an overcoat comprising an oxide and/or nitride of zirconium and/or aluminum.

11. The coated article of claim 1, wherein the absorber layer comprising NbZr is oxided and/or nitrided.

12. The coated article of claim 1, wherein the coated article has a selectivity of at least about 1.4.

13. The coated article of claim 1, wherein the coated article has a solar factor of no greater than about 28.

14. The coated article of claim 1, wherein the coated article has a visible transmission of from about 30 to 48%.

15. The coated article of claim 1, wherein the absorber layer is located between the IR reflecting layer and the glass substrate, and wherein the coating further comprises another absorber layer located between at least the second contact layer and at least part of the second dielectric layer.

16. A green colored insulating glass (IG) window unit including first and second substantially clear-colored glass substrates and a coating supported by at least the first glass substrate, the coating comprising moving away from the first glass substrate:
- a first dielectric layer;
- an absorber layer comprising NbZr;
- a second dielectric layer;
- a first contact layer;
- an IR reflecting layer comprising silver, wherein the coating has only one IR reflecting layer comprising silver;
- a second contact layer; and
- a third dielectric layer,
- wherein the IG unit has a visible transmission of from about 30 to 48%, and green color by way of an $a^*_g$ color value of from about −15.0 to −5.0 and a $b^*_g$ color value of from about −6.0 to 3.0, and wherein the IG window unit is able to achieve these characteristics including green color when having only one IR reflecting layer comprising silver.

17. The IG unit of claim 16, wherein the absorber layer is partially oxided and/or nitrided.

18. The IG unit of claim 16, wherein the coating further comprises an absorber layer comprising NiCr and/or NbZr located between at least the second contact layer and the third dielectric layer.

19. The IG unit of claim 18, wherein the absorber layer located between at least the second contact layer and the third dielectric layer comprises NbZr.

20. The IG unit of claim 16, wherein the absorber layer comprises NbZr, and wherein the first and second dielectric layers are of substantially the same material and each of the first and second dielectric layers directly contacts the absorber layer.

21. A blue-colored coated article including a coating supported by a substantially clear-colored glass substrate, the coating comprising moving away from the glass substrate:
- a first dielectric layer;
- an absorber layer comprising NbZr;
- a second dielectric layer, wherein the absorber layer is between and directly contacting the first and second dielectric layers;
- a first contact layer;
- an IR reflecting layer comprising silver;
- a second contact layer, wherein the first and second contact layers each directly contact the IR reflecting layer;
- a third dielectric layer; and
- wherein the absorber layer is provided in a location and thickness such that the coated article achieves blue coloration while having only one IR reflecting layer comprising silver.

22. A coated article including a coating supported by a substantially clear-colored glass substrate, the coating comprising moving away from the glass substrate:
- a first dielectric layer;
- a first contact layer;
- an IR reflecting layer comprising silver, the coating having only one IR reflecting layer comprising silver;
- a second contact layer, wherein the first and second contact layers each directly contact the IR reflecting layer;
- a second dielectric layer;
- a third dielectric layer;
- an absorber layer comprising NiCr or NbZr, wherein said absorber layer is located between and directly contacting said second and third dielectric layers; and
- wherein the coated article is substantially neutral-colored and the absorber layer is provided in thickness and location so that the coated article achieves neutral coloration while having only one IR reflecting layer comprising silver.

23. The coated article of claim 22, wherein said absorber layer comprises NbZr.

24. The coated article of claim 22, wherein said absorber layer comprises NiCr.

* * * * *